(12) United States Patent
Kim et al.

(10) Patent No.: US 10,599,410 B2
(45) Date of Patent: Mar. 24, 2020

(54) METHOD AND ELECTRONIC DEVICE FOR UPDATING CONFIGURATION SETTINGS

(71) Applicant: Samsung Electronics Co., Ltd, Gyeonggi-do (KR)

(72) Inventors: Young Sik Kim, Gyeonggi-do (KR); In Ku Kang, Gyeonggi-do (KR); Yu Seung Kim, Gyeonggi-do (KR); Tae Hyun Kim, Gyeonggi-do (KR); Dong Ho Jang, Gyeonggi-do (KR); Eun Jung Hyun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 251 days.

(21) Appl. No.: 15/373,443

(22) Filed: Dec. 8, 2016

(65) Prior Publication Data

US 2017/0161049 A1 Jun. 8, 2017

(30) Foreign Application Priority Data

Dec. 8, 2015 (KR) .......................... 10-2015-0173929

(51) Int. Cl.
*H04L 29/08* (2006.01)
*G06F 8/61* (2018.01)
*G06F 8/65* (2018.01)
*G06F 8/38* (2018.01)
*H04L 29/06* (2006.01)
(Continued)

(52) U.S. Cl.
CPC .................. *G06F 8/61* (2013.01); *G06F 8/38* (2013.01); *G06F 8/65* (2013.01); *H04L 41/0803* (2013.01); *H04L 41/0886* (2013.01); *H04L 47/826* (2013.01); *H04L 63/108* (2013.01); *H04L 67/26* (2013.01); *H04W 4/50* (2018.02); *H04L 63/0815* (2013.01)

(58) Field of Classification Search
CPC ..... G06F 8/61; G06F 8/65; G06F 8/38; H04L 67/26; H04L 63/0815; H04L 41/0803; H04L 41/0886; H04L 47/826; H04L 63/108; H04W 4/50
See application file for complete search history.

(56) References Cited

U.S. PATENT DOCUMENTS 6,321,337 B1 * 11/2001 Reshef .................... G06F 21/53
726/14
9,928,359 B1 * 3/2018 Vargas ................ H04L 63/1441
(Continued)

FOREIGN PATENT DOCUMENTS

KR 1020070041040 4/2007
KR 1020140011068 1/2014
(Continued)

*Primary Examiner* — Cheng-Feng Huang

(57) ABSTRACT

An electronic device includes a communication circuit that communicates with an external device, a memory configured to store first setting data corresponding to a first time period, and a processor operatively connected with the communication circuit and the memory. The processor receives second setting data corresponding to a second time period from the external device through the communication circuit if a specified time point is reached, deletes at least a portion of the first setting data based on whether a status of a user is a login status or a logout status, and applies the second setting data to the electronic device.

12 Claims, 20 Drawing Sheets

(51) Int. Cl.
*H04W 4/50* (2018.01)
*H04L 12/911* (2013.01)
*H04L 12/24* (2006.01)

(56) References Cited

U.S. PATENT DOCUMENTS

| | | | | |
|---|---|---|---|---|
| 2005/0091539 A1* | 4/2005 | Wang | ................ | G06F 21/31 726/4 |
| 2008/0147416 A1* | 6/2008 | Hill | ................ | G06F 8/36 717/107 |
| 2008/0271109 A1* | 10/2008 | Singh | ................ | H04L 63/08 726/1 |
| 2010/0049579 A1* | 2/2010 | Suzuki | ................ | G06Q 10/06311 705/7.19 |
| 2010/0058455 A1* | 3/2010 | Irudayaraj | ................ | H04L 63/02 726/11 |
| 2012/0084570 A1* | 4/2012 | Kuzin | ................ | G06F 21/41 713/182 |
| 2012/0124676 A1* | 5/2012 | Griffin | ................ | G06Q 20/12 726/28 |
| 2012/0297444 A1* | 11/2012 | Kacherov | ................ | H04L 63/20 726/1 |
| 2013/0007231 A1* | 1/2013 | Forssell | ................ | H04L 41/082 709/221 |
| 2013/0305341 A1* | 11/2013 | Baker | ................ | H04L 41/0809 726/11 |
| 2015/0142974 A1* | 5/2015 | Bernaudin | ................ | H04L 67/306 709/225 |
| 2015/0212853 A1* | 7/2015 | Makino | ................ | G06F 11/30 718/103 |
| 2017/0048236 A1 | 2/2017 | Kang et al. | | |

FOREIGN PATENT DOCUMENTS

| | | |
|---|---|---|
| KR | 1020150088196 | 7/2015 |
| KR | 1020170019807 A | 2/2017 |

* cited by examiner

METHOD AND ELECTRONIC DEVICE FOR UPDATING CONFIGURATION SETTINGS

CROSS-REFERENCE TO RELATED APPLICATION(S) AND CLAIM OF PRIORITY

The present application is related to and claims the benefit under 35 U.S.C. § 119(a) of a Korean patent application filed on Dec. 8, 2015 in the Korean Intellectual Property Office and assigned Serial number 10-2015-0173929, the entire disclosure of which is hereby incorporated by reference.

TECHNICAL FIELD

This disclosure relates to a method of updating a configuration setting of an electronic device based on time information and an electronic device performing the same.

BACKGROUND

With the development of information technology (IT) or mobile communication technologies, various types of electronic products have been developed and distributed. In particular, an electronic device, which provides a variety of functions, such as a smartphone, a tablet PC, or the like has been widely distributed nowadays.

The electronic device may be provided in, for example, a public space such as the classroom of a school, a sales site or a manufacturing site, or the like. The electronic device may be configured such that a plurality of users utilize the electronic device. For example, the plurality of users, by turns, takes a specified lecture and performs the assigned task, by using the electronic device.

In this case, to distinguish whether a user utilizing the electronic device is a legitimate user or to determine whether a user utilizes the electronic device, the electronic device may ask the user to perform a specified authentication process (e.g., login). As such, the electronic device may allow only an authenticated user to use the electronic device and may provide the authenticated user with a suitable usage environment.

For example, the user may take different lectures at intervals of specified time periods or may perform different tasks at intervals of specified time periods. For example, according to a specified lecture timetable, a student (a user) may take a mathematics lecture during a specified time period and may take a physics lecture during another specified time period. As another example, a worker (a user) that is supposed to perform a three-shift work may shift another worker after the end of his/her work.

In this case, the electronic device may change the usage environment (or a configuration setting) based on the specified time period or based on the login/logout of the user.

SUMMARY

To address the above-discussed deficiencies, it is a primary object to provide at least the advantages described below. Accordingly, an aspect of this disclosure is to provide a configuration setting updating method that is capable of improving in-use efficiency of an electronic device by matching a login/logout time point of a user and a setting change time point of the electronic device and the electronic device performing the same.

In accordance with an aspect of this disclosure, an electronic device includes a communication circuit configured to communicate with an external device, a memory configured to store first setting data corresponding to a first time period, and a processor operatively connected with the communication circuit and the memory. The processor is configured to receive second setting data corresponding to a second time period from the external device through the communication circuit if a specified time point is reached, to delete at least a portion of the first setting data based on whether a status of a user is a login or a logout, and to apply the second setting data to the electronic device.

In accordance with an aspect of this disclosure, a configuration setting updating method of an electronic device includes applying first setting data corresponding to a first time period to the electronic device, receiving second setting data corresponding to a second time period from the external device if a specified time point is reached, deleting at least a portion of the first setting data based on whether a status of a user is a login or a logout, and applying the second setting data to the electronic device.

In accordance with an aspect of this disclosure, an electronic device includes a memory configured to store a plurality of applications comprising a first application and a second application and a processor. The processor is configured to verify time information about the electronic device, to modify at least a portion of the first application or to install a third application if the time information is information corresponding to a first time period, and to modify at least a portion of the second application or to install a fourth application if the time information is information corresponding to a second time period.

Other aspects, advantages, and salient features of this disclosure will become apparent to those skilled in the art from the following detailed description, which, taken in conjunction with the annexed drawings, discloses various embodiments of this disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, it should be noted that like reference numbers are used to depict the same or similar elements, features, and structures.

DETAILED DESCRIPTION

Figure 1:
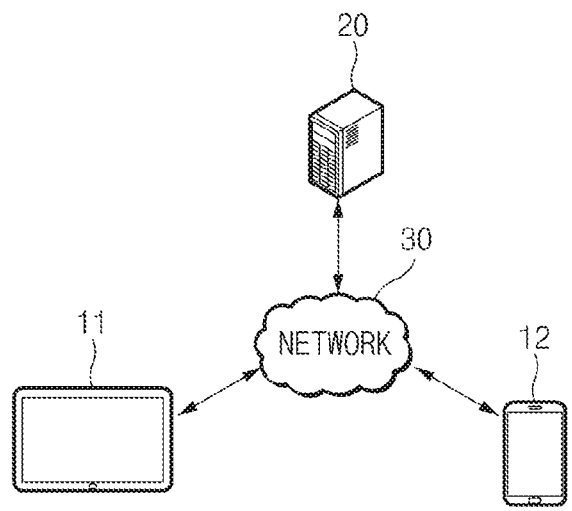
FIG. 1 is a view illustrating an environment to which various embodiments of this disclosure are applied.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication technologies.

Various embodiments of this disclosure may be described with reference to accompanying drawings. Accordingly, those of ordinary skill in the art will recognize that modification, equivalent, and/or alternative on the various embodiments described herein may be variously made without departing from the scope and spirit of this disclosure. With regard to description of drawings, similar components may be marked by similar reference numerals.

In this disclosure disclosed herein, the expressions "have", "may have", "include" and "comprise", or "may include" and "may comprise" used herein indicate existence of corresponding features (e.g., elements such as numeric values, functions, operations, or components) but do not exclude presence of additional features.

In this disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of this disclosure, but do not limit the elements. For example, "a first user device" and "a second user device" indicate different user devices regardless of the order or priority. For example, "a first user device" and "a second user device" indicate different user devices. For example, without departing the scope of this disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used herein may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. CPU, for example, a "processor configured to perform A, B, and C" may mean a dedicated processor (e.g., an embedded processor) for performing a corresponding operation or a generic-purpose processor (e.g., a central processing unit (CPU) or an application processor) which may perform corresponding operations by executing one or more software programs which are stored in a memory device.

Terms used in this disclosure are used to describe specified embodiments of this disclosure and are not intended to limit the scope of this disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of this disclosure. In some cases, even if terms are terms which are defined in the specification, they may not be interpreted to exclude embodiments of this disclosure.

An electronic device according to various embodiments of this disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or an implantable type (e.g., an implantable circuit).

According to an embodiment, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, TV boxes (e.g., Samsung HomeSync™, Apple TV™, or Google TV™), game consoles (e.g., Xbox™ and PlayStation™), electronic dictionaries, electronic keys, camcorders, electronic picture frames, and the like.

According to various embodiments, the electronic devices may include at least one of medical devices (e.g., various portable medical measurement devices (e.g., a blood glucose monitoring device, a heartbeat measuring device, a blood pressure measuring device, a body temperature measuring device, and the like)), a magnetic resonance angiography (MRA), a magnetic resonance imaging (MM), a computed tomography (CT), smayners, and ultrasonic devices), navigation devices, global navigation satellite system (GNSS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like).

According to various embodiments, the electronic devices may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment may not be limited to the above-described electronic devices and may include other electronic devices and new electronic devices according to the development of technologies.

Hereinafter, electronic devices according to various embodiments of this disclosure will be described with reference to the accompanying drawings. The term "user" used herein may refer to a person who uses an electronic device or may refer to a device (e.g., an artificial intelligence electronic device) that uses an electronic device.

FIG. 1 is a view illustrating an environment to which various embodiments of this disclosure are applied.

Referring to FIG. 1, the environment to which various embodiments of this disclosure are applied may include electronic devices 11 and 12 and a server 20 (an external device). The electronic devices 11 and 12 and the server 20 may be connected over, for example, a network 30.

According to various embodiments, the electronic devices 11 and 12 may be concurrently used by at least one user. For example, the electronic devices 11 and 12 may be implemented with various types of electronic devices such as a smartphone, a tablet PC, a laptop PC, and the like.

For example, the electronic devices 11 and 12 may receive user setting data corresponding to a logged-in user from the server 20 in response to the login of the user. As another example, the electronic devices 11 and 12 may receive time period setting data corresponding to a specific time period if a specified time point is reached. The electronic devices 11 and 12 may provide a user with an appropriate configuration setting by applying the pieces of received setting data to the electronic devices 11 and 12 (e.g., settings of a hardware/software module included in the electronic devices 11 and 12, installing of a specified application program (hereinafter, refer to as an "application"), applying of various kinds of pieces of data generated by a user, or the like).

According to various embodiments, in the case where the electronic devices 11 and 12 change the configuration setting, each of the electronic devices 11 and 12 may delete (e.g., initialize) all or a portion of setting data for supporting the configuration setting before the configuration setting is changed. For example, the configuration setting may be changed at various time points based on the specified time point and/or the login/logout time point of the user.

According to an embodiment, the electronic devices 11 and 12 may be provided in the classroom of a school. For example, a lecture may proceed according to a predefined lecture timetable in the school. The electronic devices 11 and 12 may receive time period setting data, which corresponds to subject hours (an example of a time period), from the server 20 based on the predefined lecture timetable. For example, the time period setting data corresponding to the subject hours may include an application (e.g., a calculator application or the like during a mathematics lecture) to be used at a corresponding subject, various kinds of pieces of data, and the like. As another example, if a user (a student) is logged in, the electronic devices 11 and 12 may transmit account information of the user to the server 20 and may receive user setting data of the user in response to the account information. For example, if the user is logged in, the electronic devices 11 and 12 may receive data or the like of the lecture, which is generated or modified during a previous lecture.

According to another embodiment, the electronic devices 11 and 12 may be provided in a work site (e.g., a three-shift work site, an office in a company). For example, in the work site, the subject (e.g., a worker such as a doctor, a nurse, or the like) of job performance and/or the object (e.g., a task) of job performance may vary according to a predefined work schedule. The electronic devices 11 and 12 may receive time period setting data, which corresponds to office hours (an example of a time period), from the server 20 based on the work schedule. For example, the time period setting data corresponding to the office hours may include an application (e.g., a hospital management program or the like in a hospital) to be used in a work environment, various kinds of pieces of data (e.g., materials associated with a task corresponding to each time period, and the like), and the like. As another example, if a user (a worker) is logged in, the electronic devices 11 and 12 may transmit account information of the user to the server 20 and may receive user setting data of the user in response to the account information. For example, if a user is logged in, the electronic devices 11 and 12 may receive data or the like (e.g., a patient list or the like that the user manages) that was generated or modified during office hours before a corresponding office hours of a user.

According to another embodiment, the electronic devices 11 and 12 may be provided in the meeting room of a company. For example, in the meeting room, a user (e.g., an executive or an employee of a company, or the like) may be substituted according to a predefined timetable for the meeting room. The electronic devices 11 and 12 may receive time period setting data, which corresponds to a time period (an example of a time period) during which the meeting room is occupied, from the server 20 based on the timetable for the meeting room. For example, the setting data corresponding to the time period during which the meeting room is occupied may include an application (e.g., a presentation program or the like) to be used in the meeting room, various kinds of pieces of data, and the like. As another example, if a user in the meeting room is logged in, the electronic devices 11 and 12 may transmit account information of the user to the server 20 and may receive user setting data of the user in response to the account information. For example, if the user is logged in, the electronic devices 11 and 12 may receive data or the like (e.g., email account data or the like) of the user.

According to various embodiments, the server 20 (external device) may be connected with the electronic devices 11 and 12 over the network 30. The server 20 may process a request, data, or the like received from the electronic devices 11 and 12 by including at least one processor and a memory.

According to an embodiment, the server 20 may support the control of the change (e.g., the change in settings of a hardware/software module, installing, modifying, or deleting of an application, or the like) in settings of the electronic devices 11 and 12. For example, if a specified time point is reached, the server 20 may provide time period setting data corresponding to the next time period to the electronic devices 11 and 12. Alternatively, for example, the server 20 may allow a user to log in in response to reception of user account information from the electronic devices 11 and 12 or may provide the electronic devices 11 and 12 with user setting data corresponding to the account of the logged-in user. The electronic devices 11 and 12 may receive, for example, the time period setting data corresponding to the time period and/or user setting data and may use the pieces of data to change settings.

The network 30 may establish communication between the server 20 and the electronic devices 11 and 12. The network 30 may be, for example, a telecommunications network. The telecommunications network may include at least one of a computer network, an internet, an internet of things, or a telephone network.

Figure 2:
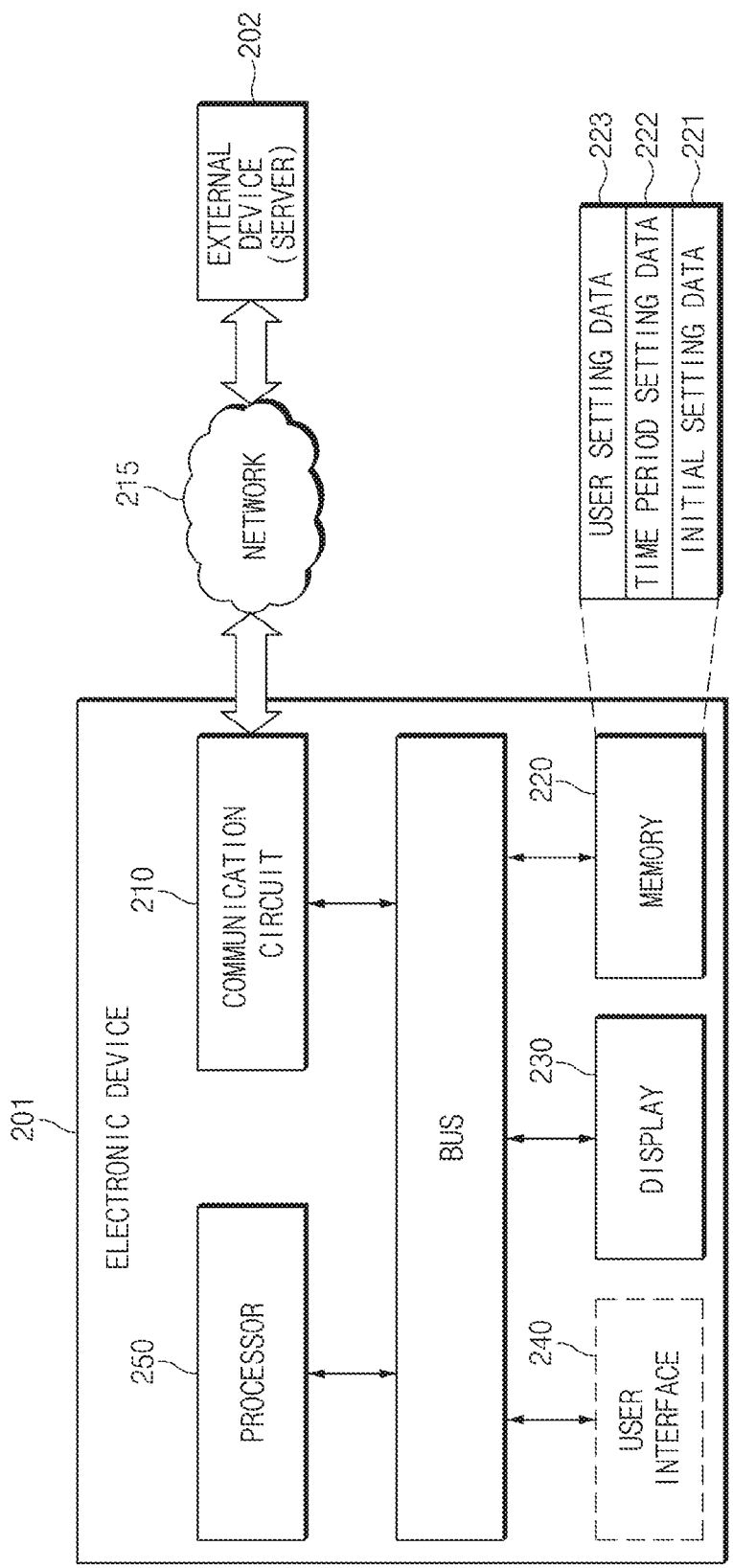
FIG. 2 illustrates a block diagram of an electronic device, according to an embodiment.

FIG. 2 illustrates a block diagram of an electronic device, according to an embodiment.

Referring to FIG. 2, for example, an electronic device 201 may correspond to the electronic device 11 or the electronic device 12 illustrated in FIG. 1, and an external device 202 may correspond to the server 20 illustrated in FIG. 1.

According to an embodiment, the electronic device 201 may include a communication circuit 210, a memory 220, a display 230, a user interface 240, and a processor 250. According to various embodiments, the electronic device 201 may additionally include various modules that are not illustrated in FIG. 2 or may not include a part of a configuration (e.g., see, the electronic device of FIG. 11 or 12).

The communication circuit 210 may establish communication with the external device (server) 202. For example, the communication circuit 210 may connect the electronic device 201 with the external device 202 over a network 215 (corresponding to the network 30 of FIG. 1). The communication circuit 210 may exchange a variety of information and/or data with the external device 202, according to various embodiments of this disclosure.

The memory 220 may include a volatile or nonvolatile memory. The memory 220 may store, for example, instructions or data associated with the communication circuit 210, the display 230, the user interface 240, or the processor 250 of the electronic device 201. For example, the processor 250 may operate various embodiments of this disclosure based on an instruction stored in the memory 220.

According to an embodiment, the memory 220 may store initial setting data 221, time period setting data 222, and/or user setting data 223, which is applied to the electronic device 201, in addition to the above-described instructions or data. The various types of pieces of setting data 221, 222, and 223 may be read by the processor 250 and may be applied to a configuration of each module of the electronic device 201. The setting data 222 may be applied to the electronic device 201, and thus the configuration setting of the electronic device 201 may be changed.

The initial setting data 221 may include data associated with an application, which is previously installed upon an initial setting of the electronic device 201, and a variety of data associated with initial setting of hardware/software included in the electronic device 201. For example, the initial setting data 221 may include data for controlling an enable/disable or on/off state of hardware/software modules included in the electronic device 201, data for setting the authority to access each of modules included in the electronic device 201, data of an application installed in the electronic device 201 upon the initial setting, or the like.

The time period setting data 222 may correspond to setting data corresponding to specified time period. In this disclosure, the time period setting data may be referred simply to as "setting data". For example, the time period setting data 222 may be setting data received from the external device 202 during a specified time period and may include data associated with an application, which is supposed to be used during a corresponding time period, and a variety of data associated with settings of hardware/software to be applied during the time period.

According to an embodiment, the time period setting data 222 may be received from the external device (server) 202 at a specified time point. For example, at a time point of a first time period, the memory 220 may store first time period setting data corresponding to the first time period. If a specified time point is reached, the electronic device 201 may receive setting data corresponding to a second time period being the next time period of the first time period from the external device 202 and may store the received setting data in the memory 220. If the setting data corresponding to the second time period is received, all or a portion of the setting data corresponding to the first time period may be deleted. That is, the time period setting data 222 may be received from the external device 202 based on a specified time period at a specified time point, and the received time period setting data 222 may be applied to the electronic device 201.

The user setting data 223 may include all kinds of data capable of being stored, installed, generated, or modified by a user. For example, the user setting data 223 may include data associated with settings of hardware/software of the electronic device 201, which is modified by a user, data associated with settings of an application, which is modified by a user, data associated with various kinds of files, which is generated by a user, or the like. In detail, the user setting data 223 may include configuration information (e.g., an enable/disable state of the communication circuit 210, or the like) of hardware/software of the electronic device 201, which a user modifies, list information of applications that the user installs, configuration information of an application that the user modifies, a document file, an image file, a video file, an email storage list, or the like.

According to various embodiments, in various types of setting data 221, 222, and 223 stored in the memory 220, the user setting data 223 may be applied in preference to the time period setting data 222, and the time period setting data 222 may be applied in preference to the initial setting data 221.

For example, the following table 1 shows on/off states of a Wi-Fi module that are set according to the various types of setting data 221, 222, and 223.

TABLE 1

| Setting data | Wi-Fi module setting (On/Off) |
| --- | --- |
| Initial setting data | On |
| Setting data (at intervals of time periods) | Off |
| User setting data | On |
| Final setting | On |

In the electronic device 201, since the user setting data 223 is applied in preference to the time period setting data 222 and the time period setting data 222 is applied in preference to the initial setting data 221, the Wi-Fi module of the electronic device 201 may be set to the "On" state based on the user setting data 223.

The display 230 may display various contents (e.g., a text, an image, a video, an icon, a symbol, and the like) to a user. According to an embodiment, the display 230 may include a touch screen and may receive, for example, a touch, gesture, proximity, or a hovering input using an electronic pen or a portion of a user's body.

The user interface 240 may include a hardware module, a software module, or a combination thereof that is implemented such that the electronic device 201 interacts with a user. For example, the user interface 240 may represent the display 230, a touch screen included in the display 230, and a combination of an icon, an image, and the like output on the display 230. Furthermore, the user interface 240 may include a biometric sensor for user authentication, various input devices (e.g., a keyboard, a mouse, and the like) for receiving an input by the user, and a program module for the biometric sensor, and the input devices in addition to the above-mentioned elements.

For example, a user may touch an icon, an image, or the like for logging in or logging out through the user interface 240, and the electronic device 201 may obtain a user input associated with a login or a logout based on the touch. Also, for example, the user interface 240 may obtain a user input associated with the settings (including settings of an application) of the electronic device 201 from a user and may send the obtained user input to the processor 250. The processor 250 may store user setting data corresponding to the user input in the memory 220 or may apply the user setting data to a configuration of each module of the electronic device 201.

The processor 250 may be connected with a module configuration (e.g., the communication circuit 201, the memory 220, the display 230, and/or the user interface 240) included in the electronic device 201. The processor 250 may be implemented with a system on chip (SoC) including at least one of, for example, an application processor (AP), a central processing unit (CPU), a graphic processing unit (GPU), or a memory.

The processor 250 may perform, for example, commands or data stored in the memory 220. For example, according to various embodiments, the processor 250 may receive a command (or an instruction), may decode the received command, and may perform an arithmetic operation or data processing based on the decoded command. For example, the processor 250 may apply various types of pieces of setting data 221, 222, and 223, which is stored in the memory 220, to the electronic device 201.

According to an embodiment, first time period setting data (e.g., an example of the time period setting data 222) corresponding to the first time period may be applied to the electronic device 201. For example, if a specified time point is reached, the processor 250 of the electronic device 201 may receive second time period setting data corresponding to the second time period from the external device (server) 202 through the communication circuit 210. The processor 250 may delete at least a portion (all or a portion) of the first time period setting data and may apply the second time period setting data to the electronic device 201, based on whether the status of a user is a login or a logout.

For example, the specified time point may lead the starting time point of the second time period and may correspond to a time point of the first time period. As such, the second time period setting data may be previously received before the starting time point of the second time period.

Moreover, for example, the second time period setting data may be received in background, and the received second time period setting data may be stored in the memory 220. Since the second time period setting data is received in background, the operation of the electronic device 201 may be maintained according to the first time period setting data while the second time period setting data is received.

According to an embodiment, if the status of a user is a login at the specified time point, the processor 250 may forcibly switch the status of the user to a logout. If the forcible logout is performed on the user, the processor 250 may delete at least a portion of the first time period setting data, may receive the second time period setting data from the external device 202, and may apply the received second time period setting data to the electronic device 201. In this case, the processor 250 may provide a user with an alarm notification associated with a forcible logout until the specified time point, for example, at intervals of specified time periods.

According to another embodiment, even though the status of a user is a login at the specified time point, the processor 250 may not forcibly switch the status of the user to a logout. For example, if a user is logged in at the specified time point and the user arbitrarily logs out after the specified time point, the processor 250 may delete at least a portion of the first time period setting data and may apply the second time period setting data to the electronic device 201, in response to the logout of the user.

According to another embodiment, if a user logs out before the specified time point is reached, the processor 250 may delete all the first time period setting data and may initialize the electronic device 201, in response to the logout of the user. For example, the processor 250 may delete other pieces of setting data 222 and 223 except the initial setting data 221 in response to the logout.

According to another embodiment, if a user is logged out before the specified time point, the processor 250 may delete all the first time period setting data and may initialize the electronic device 201, after a specified time period (or a preset time period). As another example, if the specified time point is reached before the specified time point elapses, the processor 250 may receive the second time period setting data from the external device 202 may delete at least a portion of the first time period setting data and may apply the second time period setting data to the electronic device 201.

According to various embodiments, in the electronic device 201 to which the first time period setting data corresponding to the first time period is applied, the processor 250 may obtain a user input associated with settings of the electronic device 201 through the user interface 240. The processor 250 may apply the change by the user input to the electronic device 201 and may store the user setting data 223 corresponding to the user input in the memory 220. For example, the user input may include an input associated with the change in the first time period setting data that is applied to the electronic device 201 (including an application installed in the electronic device 201).

According to an embodiment, for example, when at least a portion of the first time period setting data (e.g., the time period setting data 222) is deleted, after the processor 250 sends the user setting data 223 to the external device 202, the processor 250 may delete the user setting data 223 from the memory 220. That is, when at least a portion of the first time period setting data is deleted, the processor 250 may back up, for example, the user setting data 223 in the external device 202.

Figure 3:
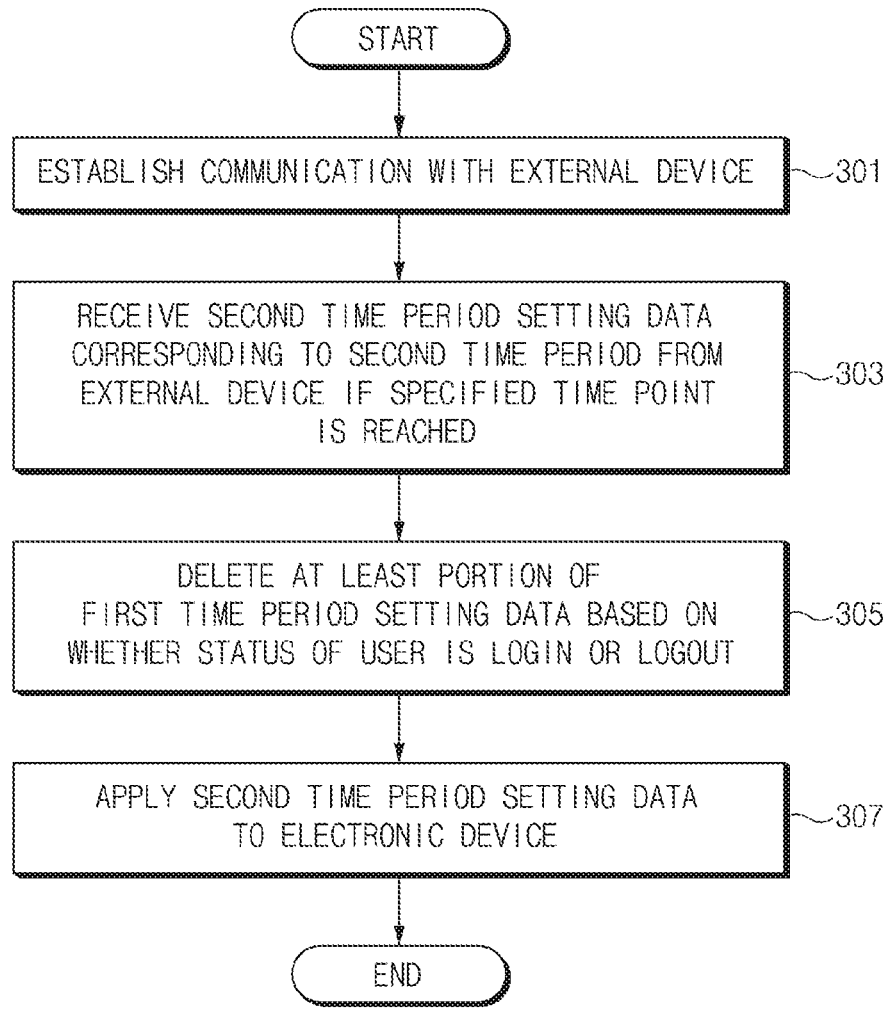
FIG. 3 illustrates a flowchart of a method of updating a configuration setting, according to an embodiment.

FIG. 3 illustrates a flowchart of a method of updating a configuration setting, according to an embodiment.

Referring to FIG. 3, the method of updating a configuration setting, according to an embodiment may include operation 301 to operation 307. Operation 301 to operation 307 may be executed by, for example, the electronic device 201 (e.g., the processor 250) illustrated in FIG. 2. For example, each of operation 301 to operation 307 may be implemented with instructions that are executable (or running) by the processor 250 of the electronic device 201. The instructions may be stored in, for example, the memory 220 of the electronic device 201. Hereinafter, operation 301 to operation 307 may be described by using the reference numeral of FIG. 2.

In operation 301, the electronic device 201 may establish communication with the external device 202. For example, first time period setting data corresponding to a first time period may be applied to the electronic device 201.

In operation 303, if a specified time point is reached, the electronic device 201 may receive second time period setting data corresponding to a second time period from the external device 202. For example, the specified time point may lead the starting time point of the second time period and may correspond to a time point of the first time period. Furthermore, for example, the second time period setting data may be received in background.

According to various embodiments, while the electronic device 201 does not establish communication with the external device 202, in the case where the specified time point is reached, the electronic device 201 may receive the second time period setting data corresponding to the second time period from the external device 202 by executing operation 301.

In operation 305, the electronic device 201 may delete at least a portion of the first time period setting data, which is previously applied to the electronic device 201, based on whether the status of a user is a login or a logout. According to an embodiment, in the case where the user setting data 223 of a logged-in user is stored in the electronic device 201, when at least a portion of the first time period setting data (e.g., the time period setting data 222) is deleted, the electronic device 201 may delete the user setting change data 223 after the electronic device 201 sends the user setting change data 223 to the external device 202.

In operation 307, the electronic device 201 may apply the received second time period setting data to the electronic device 201.

Figure 4:
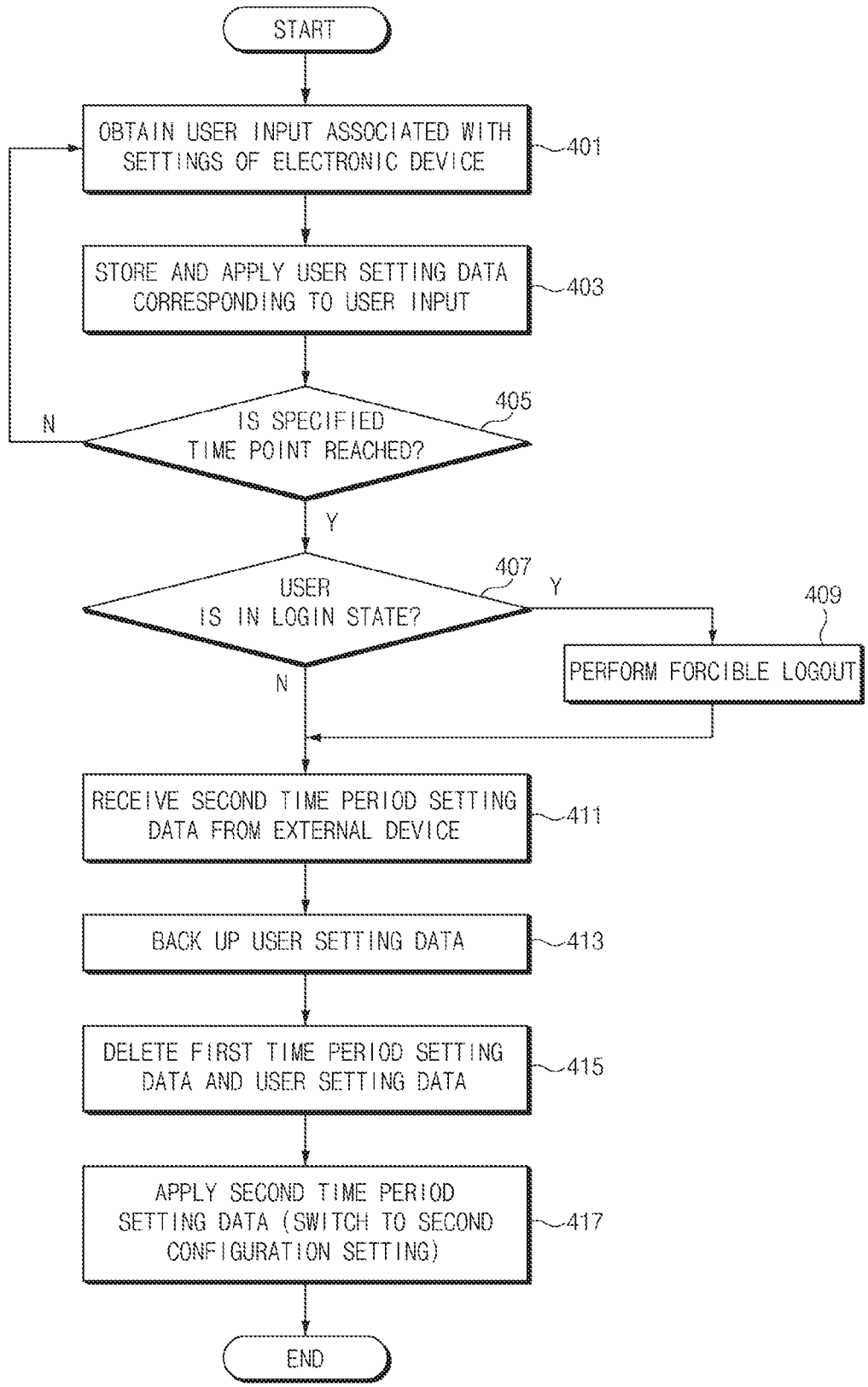
FIG. 4 illustrates a flowchart of a method of updating a configuration setting, according to another embodiment.

FIG. 4 illustrates a flowchart of a method of updating a configuration setting, according to another embodiment.

Referring to FIG. 4, the method of updating a configuration setting, according to an embodiment may include operation 401 to operation 417. Operation 401 to operation 417 may be executed by, for example, the electronic device 201 illustrated in FIG. 2. For example, each of operation 401 to operation 417 may be implemented with instructions that are executable (or running) by the processor 250 of the electronic device 201. The instructions may be stored in, for example, the memory 220 of the electronic device 201. Hereinafter, operation 401 to operation 417 may be described by using the reference numeral of FIG. 2.

In operation 401, the processor 250 of the electronic device 201 may obtain a user input associated with settings of the electronic device 201 through the user interface 240. According to an embodiment, first time period setting data (an example of the time period setting data 222) corresponding to the first time period may be applied to the electronic device 201. According to another embodiment, any time period setting data may not be set in the electronic device 201. In this case, an operation in which the first time period setting data is applied to the electronic device 201 may be executed before operation 401.

For example, a hardware/software module (e.g., an application, various kinds of pieces of data, or the like) of the electronic device 201 may be implemented based on the first time period setting data. According to an embodiment, the user input may include an input associated with the change in the first time period setting data.

In operation 403, the processor 250 of the electronic device 201 may store the user setting data 223 corresponding to the user input in the memory 220, and the user setting data 223 may be applied to the electronic device 201. For example, the change in settings of a hardware/software module included in the electronic device 201, the installation and the modification of an application, the generation or the modification of various kinds of pieces of data, or the like may be made by the user input. Meanwhile, according to various embodiments, operation 401 and operation 403 may be omitted.

In operation 405, the processor 250 of the electronic device 201 may determine, for example, whether a specified time point is reached, by a time trigger of a timer. For example, if it is determined that the specified time point is reached, the processor 250 may proceed to operation 407. If not, the processor 250 may return to operation 401.

For example, the specified time point may lead the starting time point of the second time period and may correspond to a time point of the first time period. The specified time point may be variously set as well as setting of the specified time point in the embodiment. For example, the specified time point may correspond to a boundary time point between the first time period and the second time period or may be included in a separate time period provided between the first time period and the second time period.

According to various embodiments, the specified time point may be a time point based on the schedule of a currently logged-in user. For example, the specified time point may correspond to a boundary time point between a time period based on a current schedule and a time period based on a follow-up schedule.

In operation 407, the processor 250 of the electronic device 201 may determine whether a user is logged in at the specified time point. If the user is logged in at the specified time point, the processor 250 may proceed to operation 409. If not (e.g., a logout), the processor 250 may proceed to operation 411. The login of a user may be made through various personal authentication methods, for example, identification (ID) and password authentication, biometric authentication (e.g., fingerprint authentication, iris authentication, or the like), and the like.

In operation 409, since a user is logged in at the specified time point (Y in operation 407), the processor 250 of the electronic device 201 may perform a forcible logout on the user. According to various embodiments, before the specified time point is reached, the electronic device 201 may provide the user with an alarm notification associated with the logout of the user.

In operation 411, if the specified time point is reached, the processor 250 of the electronic device 201 may receive the second time period setting data corresponding to the second time period from the external device 202 through the communication circuit 210. For example, if the specified time point is reached, the processor 250 may receive the second time period setting data from the external device 202 in background in response to the logout of the user. According to various embodiments, operation 411 may be executed independently of operation 407 and operation 409. For example, while a current user is logged in, the processor 250 of the electronic device 201 may receive the second time period setting data (e.g., data corresponding to a second time period schedule of a current user) without performing the (forcible) logout on the user.

In operation 413, the processor 250 of the electronic device 201 may back up the user setting data 223 stored in operation 403. For example, the processor 250 may send the user setting data 223 to the external device 202.

In operation 415, the processor 250 of the electronic device 201 may delete at least a portion of the first time period setting data that is applied to the electronic device 201. For example, the processor 250 may delete all the first time period setting data or may delete only a portion of the first time period setting data. For example, the processor 250 may delete all the first time period setting data or may delete only the data, which is received in operation 411 and which is not common with the second time period setting data, from among the first time period setting data.

According to various embodiments, when at least a portion of the first setting data is deleted, after the processor 250 sends the user setting data 223 to the external device 202, the processor 250 may delete the user setting data 223 from the memory 220.

In operation 417, the processor 250 of the electronic device 201 may apply the second time period setting data to the electronic device 201. Accordingly, a hardware/software module (e.g., an application, various kinds of pieces of data, or the like) of the electronic device 201 may be implemented based on the second time period setting data.

Figure 5:
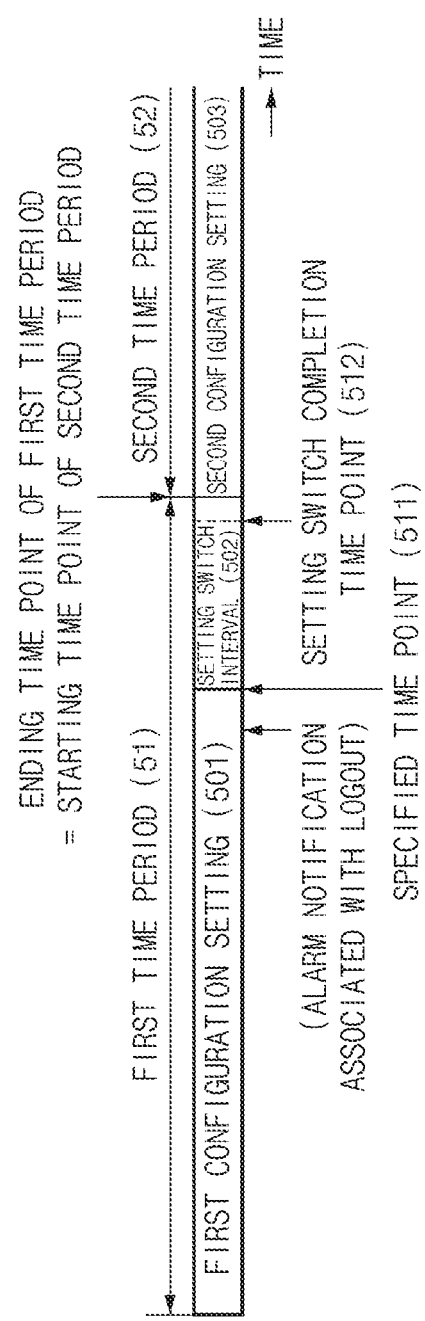
FIG. 5 illustrates a timeline for describing a method of updating a configuration setting, according to an embodiment.

FIG. 5 illustrates a timeline for describing a method of updating a configuration setting, according to an embodiment.

Referring to FIG. 5, the timeline of an electronic device for describing the method of updating a configuration setting, according to an embodiment is illustrated. For example, the timeline illustrated in FIG. 5 may correspond to a timeline according to the operation of the electronic device 201 of FIG. 2. Furthermore, the operation of the electronic device in the timeline may correspond to the operation of the flowchart illustrated in FIG. 4.

According to an embodiment, the electronic device may operate in a first configuration setting 501 based on applying of first time period setting data corresponding to a first time period 51. For example, a hardware/software module (e.g., application, various kinds of pieces of data, or the like) embedded in the electronic device may be configured based on the first time period setting data, and thus the electronic device may operate in the first configuration setting 501.

Also, in the first configuration setting 501, for example, the electronic device may be logged in by a first user. User setting data of the first user received in response to the login of the first user may be stored in the electronic device and may be applied to the electronic device.

According to various embodiments, in the first configuration setting 501, the electronic device may obtain a user input associated with settings of the electronic device from the user. The setting change that occurs according to the user input may be the user setting data and may be stored or updated in the electronic device (above, corresponding to operation 401 and operation 403 of FIG. 4).

According to an embodiment, while the electronic device operates in the first configuration setting 501, if a specified time point 511 is reached, the electronic device may perform a logout on a user. For example, in the case where the status of a user is a login, the electronic device may forcibly switch the status of the user to a logout (see, operation 405 to operation 409 of FIG. 4). According to various embodiments, before a forcible logout is performed, an alarm notification for notifying the user of the forcible logout may be provided.

Moreover, according to an embodiment, if the specified time point 511 is reached, the electronic device may receive second time period setting data from a server during a specified setting switch interval 502 by using a separate process (e.g., a process in background). The electronic device may back up the user setting data, may delete at least a portion of the first time period setting data, and may apply the second time period setting data, which is completely received, to the electronic device (see, operation 411 to operation 417 of FIG. 4).

According to various embodiments, since the electronic device executes an operation of receiving the second time period setting data and an operation of backing up the user setting data, in background during the setting switch interval 502, the electronic device may maintain the first configuration setting 501 while the electronic device executes the operations. Accordingly, as of the ending time point of the setting switch interval 502, that is, a completion time point (a setting switch completion time point 512) of applying of the second time period setting data, the status of the electronic device may be switched to a second configuration setting.

FIGS. 6A to 6F illustrate a screen of an electronic device, according to an embodiment.

Figure 6A:
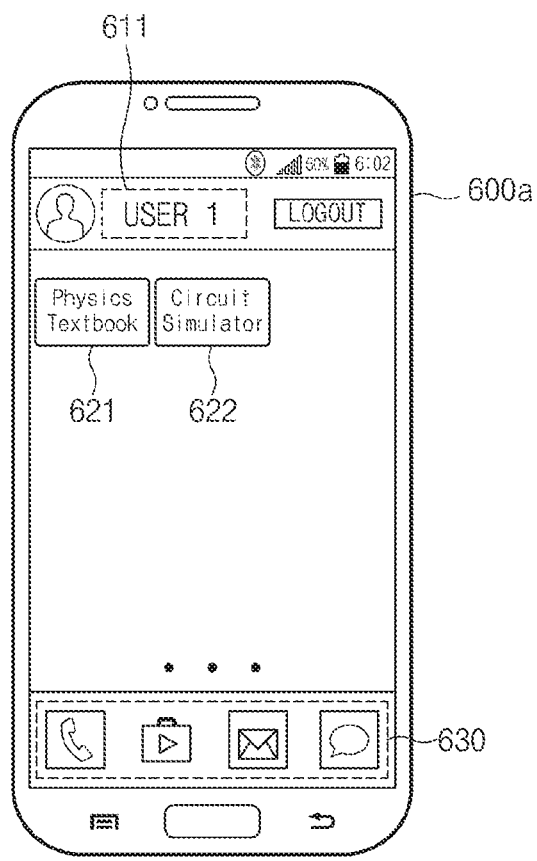
FIGS. 6A to 6F illustrate a screen of an electronic device, according to an embodiment.

Referring to FIG. 6A, an electronic device 600a that operates in the first configuration setting 501 of FIG. 5 is illustrated. In the electronic device 600a, an object 611 indicating a logged-in user, icons 621 and 622 of applications installed according to first time period setting data, and icons 630 of default applications installed according to initial setting data are output on a display.

According to an embodiment, the first configuration setting (e.g., the first configuration setting 501 of FIG. 5) of the electronic device 600a may be implemented by applying physics lecture setting data (the first time period setting data) corresponding to physics lecture time (e.g., the first time period 51 of FIG. 5) to the electronic device 600a.

For example, if the physics lecture setting data (the first time period setting data) is applied to the electronic device 600a, at least one application may be installed in the electronic device 600a. For example, at least one application (e.g., a physics textbook application, a circuit analysis simulator application, or the like) that is suitable for a physics lecture may be installed in the electronic device 600. The icons 621 and 622 of the installed applications may be output on the home screen of the electronic device 600a. Although not illustrated, various files for the physics lecture may be received from a server, and the files may be stored in the electronic device 600a.

According to an embodiment, since "user 1" is logged in to the electronic device 600a, the object 611 indicating a user that is logged in may be output on a portion of the display. Also, for example, the electronic device 600a may receive a file or the like (user setting data), which the "user 1" used or generated at a previous physics lecture time, from a server in response to the login of "user 1".

Figure 6B:
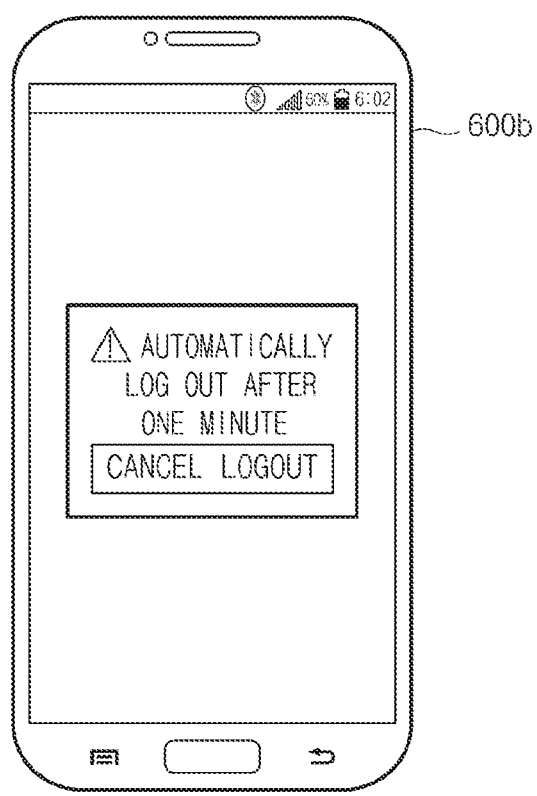

Referring to FIG. 6B, the electronic device 600b that approaches a forcible logout is illustrated. While the electronic device 600b operates in the first configuration setting, if a specified time point (e.g., the specified time point 511) is reached, the electronic device 600b may forcibly switch the status of a logged-in user to a logout. Accordingly, before one minute before the forcible logout, as illustrated in FIG. 6B, the electronic device 600b may provide a user with, for example, a notification that the user will be automatically logged out after one minute.

Figure 6C:
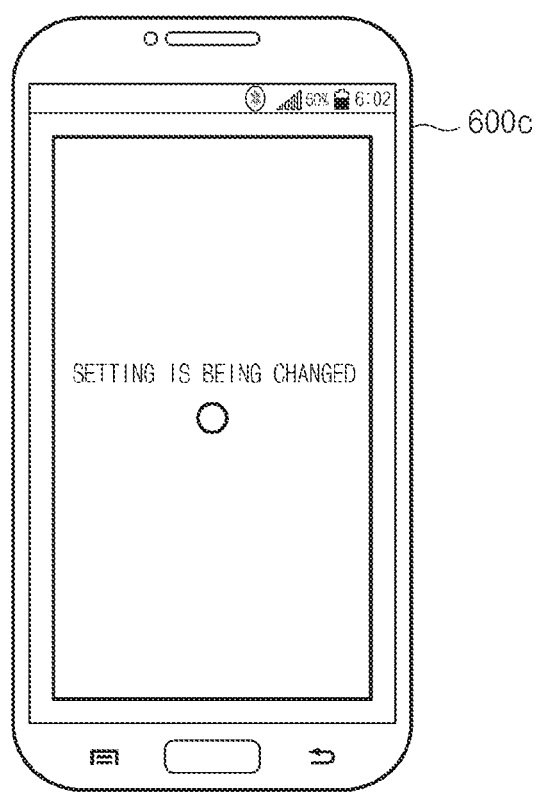

Referring to FIG. 6C, the electronic device 600c that switches from the first configuration setting to a second configuration setting is illustrated. As illustrated in FIG. 6C, a notification that setting is being changed may be output on the display of the electronic device 600c. According to an embodiment, an operation of receiving the second time period setting data (mathematics lecture setting data) and an operation of backing up user setting data may be executed in background. Accordingly, the display screen of the electronic device 600c may be output while an operation of deleting the first time period setting data (physics lecture setting data) and an operation of applying the second time period setting data (mathematics lecture setting data) are executed.

Figure 6D:
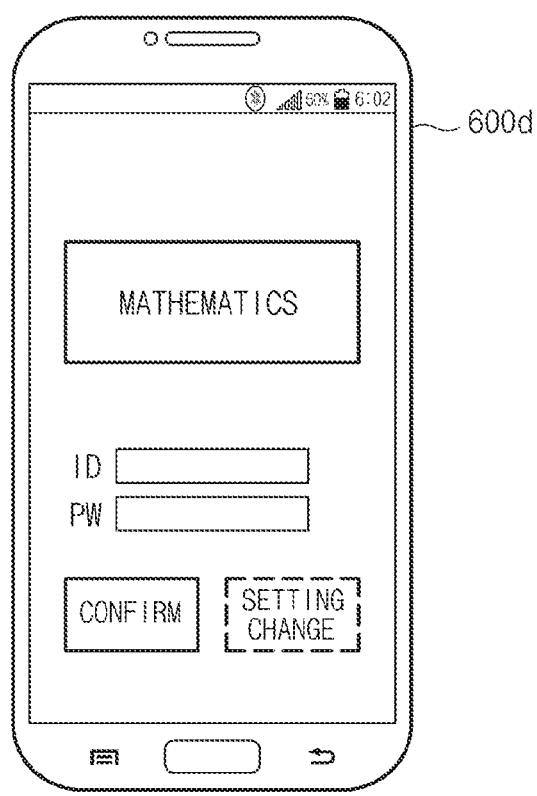

Referring to FIG. 6D, an electronic device 600d of which the status is switched to the second configuration setting is illustrated. A user interface for the login of a user may be implemented on the electronic device 600d. For example, the second time period setting data (the mathematics lecture setting data) is not output on a display because the user interface for the login but is applied to the electronic device 600d. For example, after the user logs in by inputting an ID and a password, the user may utilize the electronic device 600d of which the status is switched to the second configuration setting.

Figure 6E:
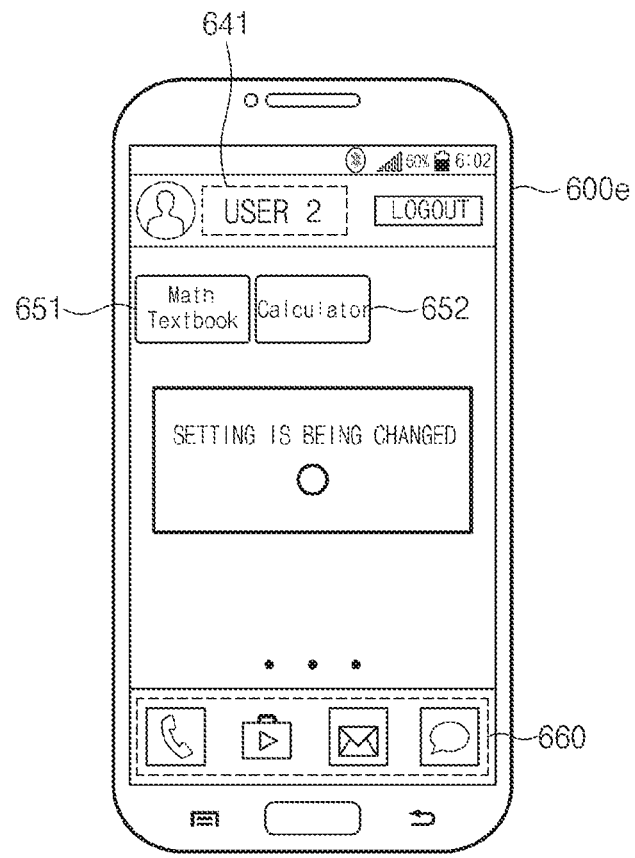

Referring to FIG. 6E, the electronic device 600e of which the setting is changed according to the login of a user is illustrated. According to an embodiment, the second user (or "user 2") may log in to the electronic device 600d of FIG. 6D of which the status is switched to the second configuration setting. If the second user is logged in, the electronic device 600d may temporarily output the screen of the electronic device 600e illustrated in FIG. 6E.

For example, an object 641 indicating a logged-in user, icons 651 and 652 (e.g., a mathematics textbook application and a calculator application) of applications installed based on the second time period setting data (the mathematics lecture setting data), and icons 660 of default applications installed based on initial setting data may be output on the display of the electronic device 600e.

According to an embodiment, the electronic device 600e may transmit account information of the second user to a server in response to the login of the second user, and may receive user setting data of the second user in response to the account information of the second user. The received user setting data of the second user may be stored in the electronic device 600e and may be applied to the electronic device 600e. For example, the screen of the electronic device 600e illustrated in FIG. 6E may be output while the user setting data of the second user is applied to the electronic device.

Figure 6F:
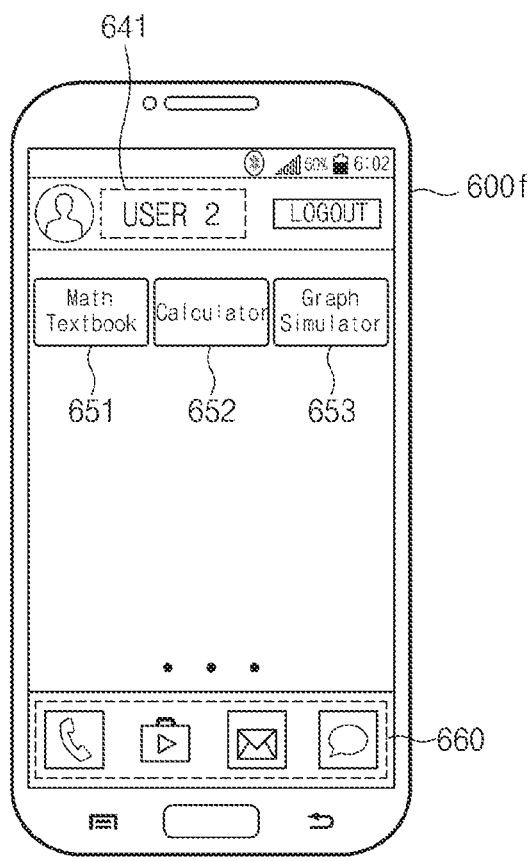

Referring to FIG. 6F, the electronic device 600f of which the setting change is completed according to the login of the second user is illustrated. For example, the screen of the electronic device 600f illustrated in FIG. 6F may be output after outputting of the screen of the electronic device 600e illustrated in FIG. 6E.

For example, a "graph simulator" application that the second user installed at a previous mathematics time may be additionally installed in the electronic device 600f. That is, data associated with the "graph simulator" application may be included in the user setting data of the second user received in response to the login of the second user. Accordingly, an icon 653 of the "graph simulator" may be additionally output on the screen of the electronic device 600f in addition to the screen configuration of the electronic device 600e illustrated in FIG. 6E.

Figure 7:
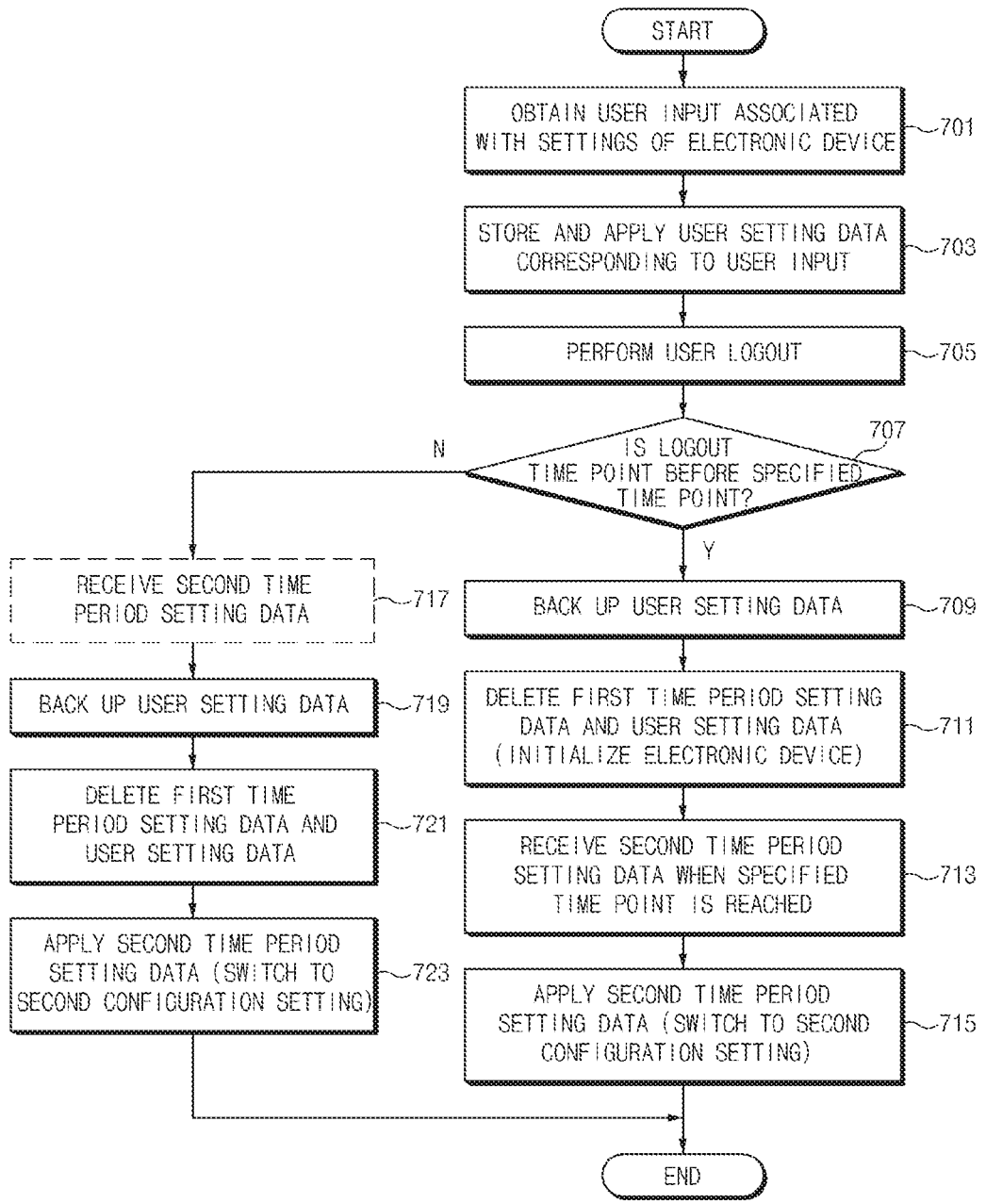
FIG. 7 illustrates a flowchart of a method of updating a configuration setting, according to another embodiment.

FIG. 7 illustrates a flowchart of a method of updating a configuration setting, according to another embodiment.

Referring to FIG. 7, the method of updating a configuration setting, according to an embodiment may include operation 701 to operation 723. Operation 701 to operation 723 may be executed by, for example, the electronic device 201 illustrated in FIG. 2. For example, each of operation 701 to operation 723 may be implemented with instructions executed (or running) by the processor 250 of the electronic device 201. The instructions may be stored in, for example, the memory 220 of the electronic device 201. Hereinafter, the reference numerals of FIG. 2 will be used to describe operation 401 to operation 417, and a description duplicated with a description given with reference to FIG. 4 may not be repeated here.

In operation 701, the processor 250 of the electronic device 201 may obtain a user input associated with settings of the electronic device 201 through the user interface 240. According to an embodiment, first time period setting data corresponding to a first time period may be applied to the electronic device 201.

In operation 703, the processor 250 of the electronic device 201 may store the user setting data 223 corresponding to the user input in the memory 220, and the user setting data 223 may be applied to the electronic device 201.

In operation 705, a user may perform a logout through the user interface 240 of the electronic device 201.

In operation 707, the processor 250 of the electronic device 201 may determine whether a logout time point in operation 705 leads a specified time point. If the logout time point leads the specified time point, the processor 250 may proceed to operation 709. If not, the processor 250 may proceed to operation 717.

In operation 709, since the logout time point in operation 705 leads the specified time point, the processor 250 of the electronic device 201 may back up the user setting data 223 in response to the logout of the user. For example, the processor 250 may send the user setting data 223 to the external device 202.

In operation 711, since the logout time point in operation 705 leads the specified time point, the processor 250 of the electronic device 201 may delete all the first time period setting data and may initialize the electronic device 201, in response to the logout of the user. According to various embodiments, when all the first time period setting data is deleted, the processor 250 may delete the user setting data 223 from the memory 220.

In operation 713, if the specified time point is reached, the processor 250 of the electronic device 201 may receive second time period setting data corresponding to a second time period from the external device 202 through the communication circuit 210.

In operation 715, the processor 250 of the electronic device 201 may apply the second time period setting data to the electronic device 201. Accordingly, the status of the electronic device 201 may be switched to a second configuration setting.

Meanwhile, in operation 717, the processor 250 of the electronic device 201 may receive the second time period setting data corresponding to the second time period from the external device 202 through the communication circuit 210. Since the logout time point in operation 705 is the same as the specified time point or lags the specified time point, the processor 250 may previously receive the second time period setting data corresponding to the second time period from the external device 202.

In operation 719, since the user is logged out after the specified time point, the processor 250 of the electronic device 201 may back up the user setting data 223 in response to the logout of the user. For example, the processor 250 may send the user setting data 223 to the external device 202.

In operation 721, the processor 250 of the electronic device 201 may delete at least a portion of the first time period setting data. According to various embodiments, when at least a portion of the first time period setting data is deleted, the processor 250 may delete the user setting data 223 from the memory 220.

In operation 723, the processor 250 of the electronic device 201 may apply the second time period setting data, which was previously received, to the electronic device 201. Accordingly, the status of the electronic device 201 may be switched to the second configuration setting.

Figure 8A:
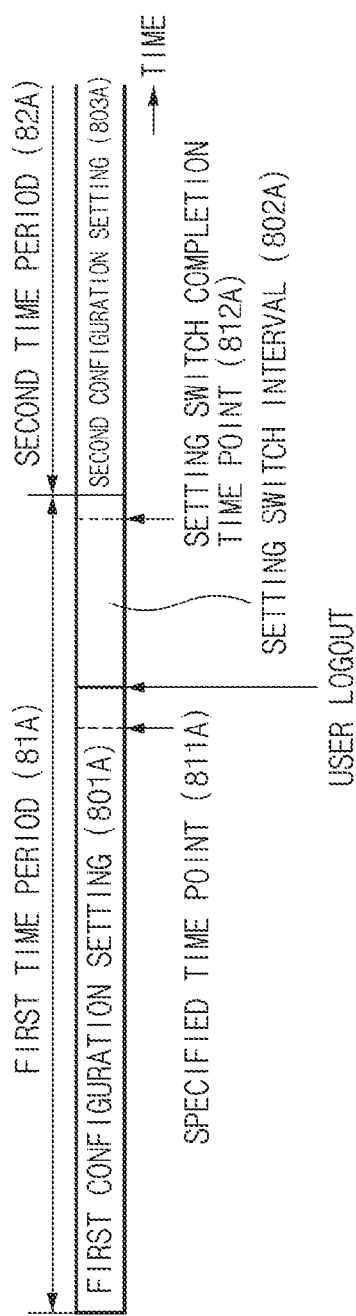
FIGS. 8A and 8B illustrate timelines for describing a method of updating a configuration setting, according to another embodiment.

FIG. 8A illustrates a timeline for describing a method of updating a configuration setting, according to another embodiment.

Referring to FIG. 8A, the timeline of an electronic device for describing the method of updating a configuration setting, according to an embodiment is illustrated. For example, the timeline illustrated in FIG. 8A may correspond to a timeline based on the operation of the electronic device 201 of FIG. 2. Furthermore, the operation of the electronic device in the timeline may correspond to operation 701 to operation 707 and operation 717 to operation 723 in the flowchart illustrated in FIG. 7.

According to an embodiment, the electronic device may operate in a first configuration setting 801a based on applying of first time period setting data corresponding to a first time period 81a. Also, the first configuration setting 801a, for example, the electronic device may be logged in by a first user. User setting data of the first user received in response to the login of the first user may be stored in the electronic device and may be applied to the electronic device.

According to various embodiments, in the first configuration setting 801a, the electronic device may obtain a user input associated with settings of the electronic device from a user. The setting change that occurs according to the user input may be the user setting data and may be stored or updated in the electronic device (above, corresponding to operation 701 and operation 703 of FIG. 7).

According to an embodiment, while the electronic device operates in the first configuration setting 801a, if a specified time point 811a is reached, the electronic device may receive a second time period setting data corresponding to a second time period 82a from a server by using a separate process (e.g., a process in background) as of the specified time point 811a (see, operation 717 of FIG. 7). Since the electronic device executes an operation of receiving the second time period setting data in background, the electronic device may maintain the first configuration setting 801a while the electronic device executes the operation.

According to an embodiment, while the electronic device operates in the first configuration setting 801a, a user may be logged out at the specified time point 811a or after the specified time point 811a (see, 'N' in operation 705 and operation 707 of FIG. 7). During a specified setting switch interval 802a, the electronic device may back up user setting data, may delete the first time period setting data and the user setting data, and may apply the second time period setting data that is previously received if the user logs out after the specified time point 811a (see, operation 721 to operation 723 of FIG. 7). As of the ending time point of the setting switch interval 802a, that is, a completion time point (a setting switch completion time point 812a) of applying of the second time period setting data, the status of the electronic device may be switched to a second configuration setting 803a.

Figure 8B:
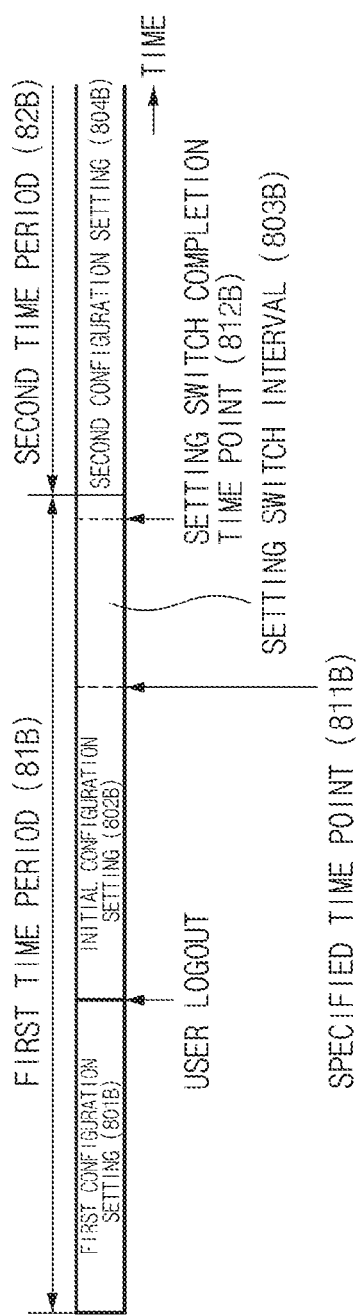

FIG. 8B illustrates a timeline for describing a method of updating a configuration setting, according to another embodiment.

Referring to FIG. 8B, the timeline of an electronic device for describing the method of updating a configuration setting, according to an embodiment is illustrated. For example, the timeline illustrated in FIG. 8B may correspond to a timeline according to the operation of the electronic device 201 of FIG. 2. Furthermore, the operation of the electronic device in the timeline may correspond to operation 701 to operation 715 in the flowchart illustrated in FIG. 7.

According to an embodiment, the electronic device may operate in a first configuration setting 801b based on applying of first time period setting data corresponding to a first time period 81b. Also, the first configuration setting 801b, for example, the electronic device may be logged in by a first user. User setting data of the first user received in response to the login of the first user may be stored in the electronic device and may be applied to the electronic device.

According to various embodiments, in the first configuration setting 801b, the electronic device may obtain a user input associated with settings of the electronic device from a user. The setting change that occurs according to the user input may be the user setting data and may be stored or updated in the electronic device (above, corresponding to operation 701 and operation 703 of FIG. 7).

According to an embodiment, while the electronic device operates in the first configuration setting 801b, a user may be logged out before the specified time point 811b (see, 'Y' in operation 705 and operation 707 of FIG. 7). If a user is logged out before the specified time point 811b, the electronic device may back up user setting data and may delete both the first time period setting data and the user setting data. In other words, the electronic device may be initialized and the status of the electronic device may be switched to an initial configuration setting 802b (see, operation 709 and operation 711 of FIG. 7).

Afterwards, if the specified time point 811b is reached, the status of the electronic device may change from the initial configuration setting 802b to a setting switch interval 803b. As of the specified time point 811b, the electronic device may receive the second time period setting data from a server by using a separate process (e.g., a process in background). Furthermore, the electronic device may apply the received second time period setting data (see, operation 713 to operation 715 of FIG. 7). As of the ending time point of the setting switch interval 803b, that is, a completion time point (a setting switch completion time point 812b) of applying of the second time period setting data, the status of the electronic device may be switched to a second configuration setting 804b.

Figure 9:
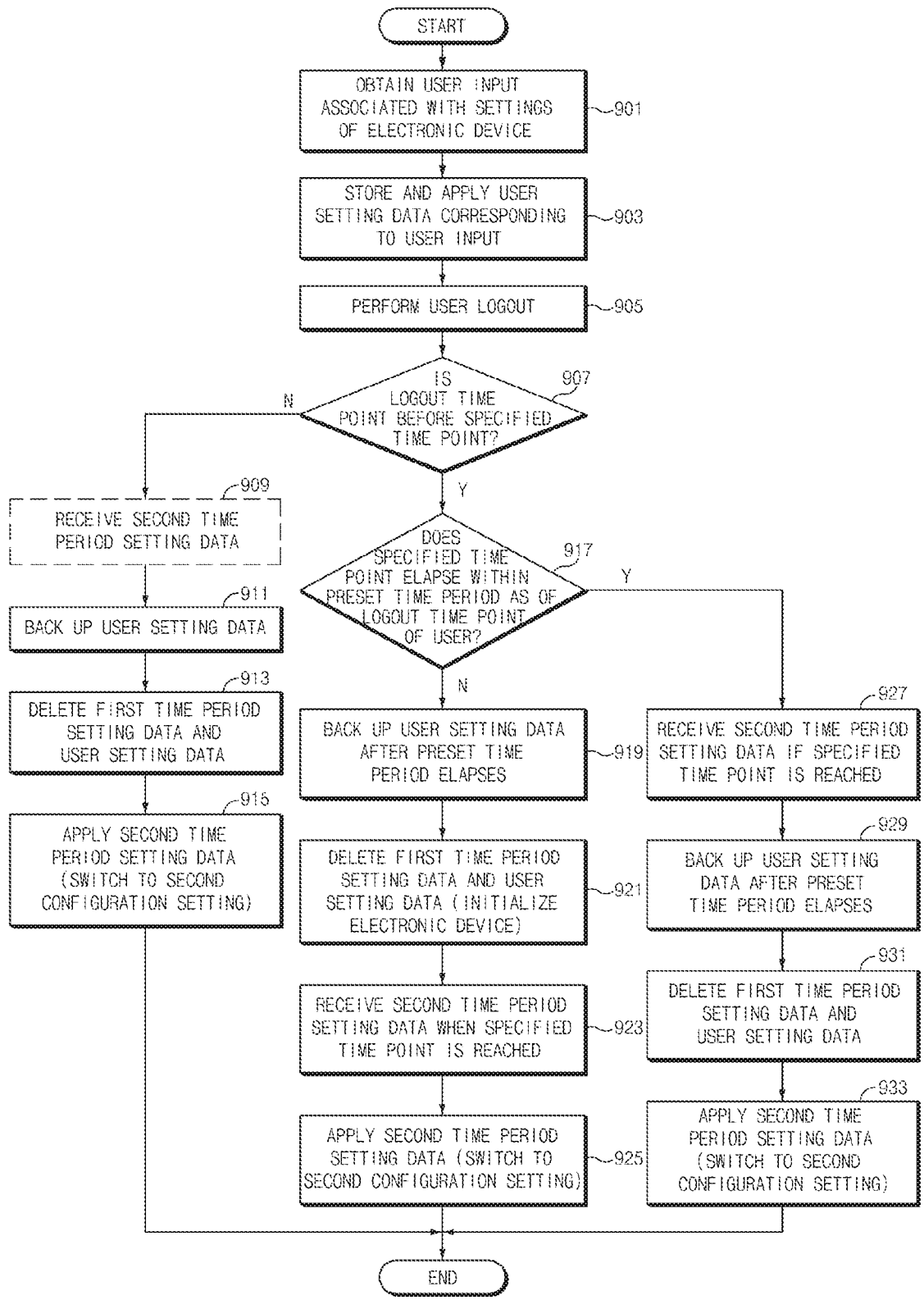
FIG. 9 illustrates a flowchart of a method of updating a configuration setting, according to another embodiment.

FIG. 9 illustrates a flowchart of a method of updating a configuration setting, according to another embodiment.

Referring to FIG. 9, the method of updating a configuration setting, according to an embodiment may include operation 901 to operation 933. Operation 901 to operation 933 may be executed by, for example, the electronic device 201 illustrated in FIG. 2. For example, each of operation 901 to operation 933 may be implemented with instructions executed (or running) by the processor 250 of the electronic device 201. The instructions may be stored in, for example, the memory 220 of the electronic device 201. Hereinafter, operation 901 to operation 933 may be described by using the reference numeral of FIG. 2. Also, operation 901 to operation 915 correspond to operation 701 to operation 707 and operation 717 to operation 723, and thus a duplicated description is not repeated here.

In operation 917, since the logout time point in operation 905 leads the specified time point ('Y' in operation 907), the processor 250 of the electronic device 201 may determine whether a specified time point elapses within a preset time period (e.g., five to ten minutes), as of the logout time point of a user. For example, the electronic device 201 may proceed to operation 927 if the specified time point elapses within the preset time period as of the logout time point of a user. If not, the electronic device 201 may proceed to operation 919.

In operation 919, since the specified time point does not elapse within the preset time period as of the logout time point of a user ('N' in operation 917), the processor 250 of the electronic device 201 may back up the user setting data 223 after the preset time period elapses. For example, the processor 250 may send the user setting data 223 to the external device 202.

In operation 921, the processor 250 of the electronic device 201 may delete all the first time period setting data and may initialize the electronic device. According to various embodiments, when all the first time period setting data is deleted, the processor 250 may also delete the user setting data 223 from the memory 220.

In operation 923, if the specified time point is reached, the processor 250 of the electronic device 201 may receive the second time period setting data corresponding to the second time period from the external device 202 through the communication circuit 210.

In operation 925, the processor 250 of the electronic device 201 may apply the second time period setting data to the electronic device 201. Accordingly, the status of the electronic device 201 may be switched to a second configuration setting.

Meanwhile, in operation 919, since the specified time point elapses within the preset time period as of the logout time point of a user ('Y' in operation 917), the processor 250 of the electronic device 201 may receive the second time period setting data corresponding to the second time period from the external device 202 through the communication circuit 210.

In operation 929, the processor 250 of the electronic device 201 may back up the user setting data 223 after the specified time point elapses as of the logout time point of a user. For example, the processor 250 may send the user setting data 223 to the external device 202.

In operation 931, the processor 250 of the electronic device 201 may delete at least a portion of the first time period setting data. According to various embodiments, when at least a portion of the first time period setting data is deleted, the processor 250 may delete the user setting data 223 from the memory 220.

In operation 933, the processor 250 of the electronic device 201 may apply the second time period setting data, which was previously received in operation 927, to the electronic device 201. Accordingly, the status of the electronic device 201 may be switched to a second configuration setting.

Figure 10A:
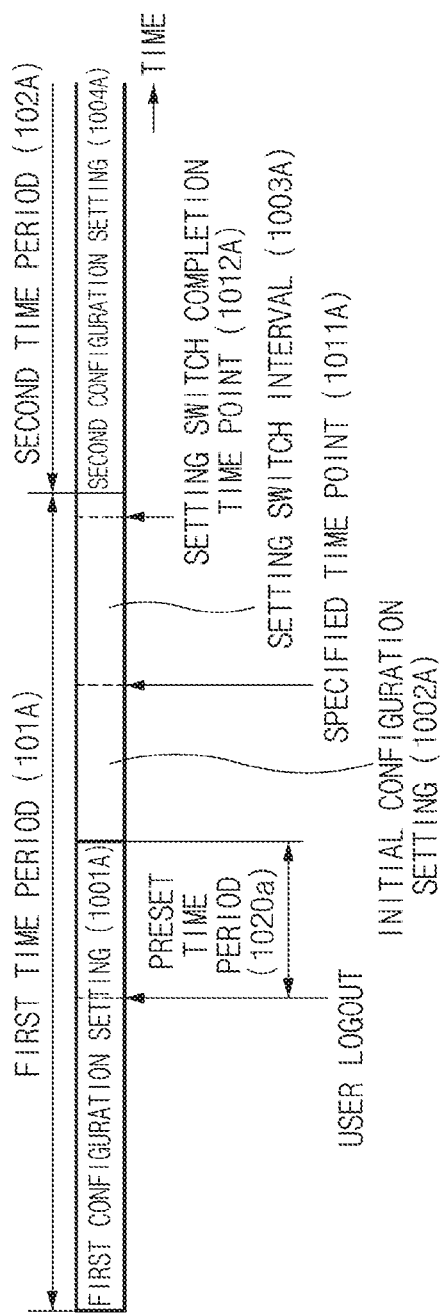
FIGS. 10A and 10B illustrate timelines for describing a method of updating a configuration setting, according to another embodiment.

FIG. 10A illustrates a timeline for describing a method of updating a configuration setting, according to another embodiment.

Referring to FIG. 10A, the timeline of an electronic device for describing the method of updating a configuration setting, according to an embodiment is illustrated. For example, the timeline illustrated in FIG. 10A may correspond to a timeline based on the operation of the electronic device 201 of FIG. 2. Furthermore, the operation of the electronic device in the timeline may correspond to operation 901 to operation 907 and operation 917 to operation 925 in the flowchart illustrated in FIG. 9.

According to an embodiment, the electronic device may operate in a first configuration setting 1001a based on applying of first time period setting data corresponding to a first time period 101a. Also, the first configuration setting 1001a, for example, the electronic device may be logged in by a first user. User setting data of the first user received in response to the login of the first user may be stored in the electronic device and may be applied to the electronic device.

According to various embodiments, in the first configuration setting 1001a, the electronic device may obtain a user input associated with settings of the electronic device from a user. The setting change that occurs according to the user input may be the user setting data and may be stored or updated in the electronic device (above, corresponding to operation 901 and operation 903 of FIG. 9).

According to an embodiment, while the electronic device operates in the first configuration setting 1001a, a user may be logged out before a specified time point 1011a (see, 'Y' in operation 905 and operation 907 of FIG. 9).

According to an embodiment, the electronic device may determine whether the specified time point 1011a elapses within a preset time period 1020a as of the logout time point of a user (see, operation 917 of FIG. 9). For example, since the specified time point 1011a does not elapse within the preset time period 1020a as of the logout time point of a user (see, 'N' in operation 917 of FIG. 9), the electronic device may back up user setting data and may delete both the first time period setting data and the user setting data. In other words, the electronic device may be initialized and the status of the electronic device may be switched to an initial configuration setting 1002a (see, operation 921 of FIG. 9).

Afterwards, if the specified time point 1011a is reached, the status of the electronic device may change from the initial configuration setting 1002a to a setting switch interval 1003a. As of the specified time point 1011a, the electronic device may receive the second time period setting data from a server by using a separate process (e.g., a process in background). Furthermore, the electronic device may apply the received second time period setting data (see, operation 923 to operation 925 of FIG. 9). As of the ending time point of the setting switch interval 1003*a*, that is, a completion time point (a setting switch completion time point 1012*a*) of applying of the second time period setting data, the status of the electronic device may be switched to a second configuration setting 1004*a*.

Figure 10B:
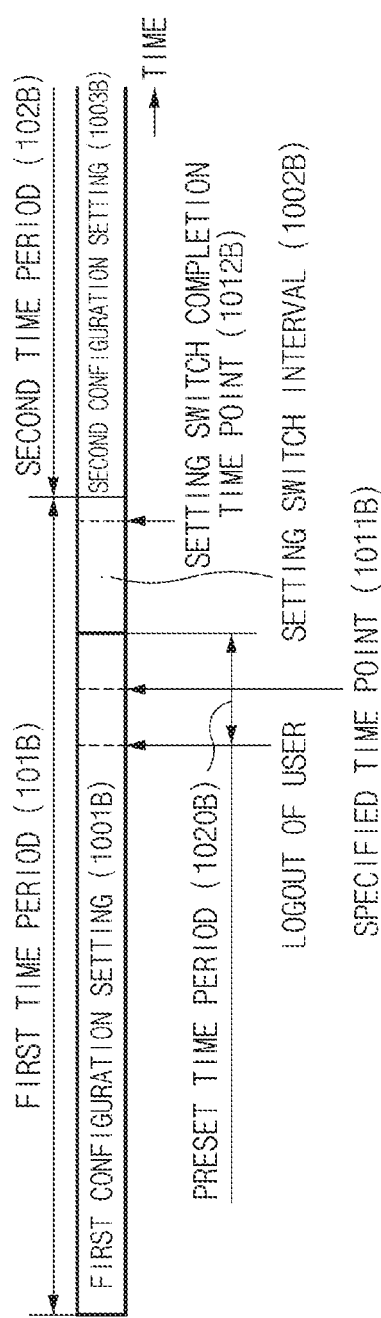

FIG. 10B illustrates a timeline for describing a method of updating a configuration setting, according to another embodiment.

Referring to FIG. 10B, the timeline of an electronic device for describing the method of updating a configuration setting, according to an embodiment is illustrated. For example, the timeline illustrated in FIG. 10B may correspond to a timeline according to the operation of the electronic device 201 of FIG. 2. Furthermore, the operation of the electronic device in the timeline may correspond to operation 901 to operation 917 and operation 927 to operation 933 in the flowchart illustrated in FIG. 9.

According to an embodiment, the electronic device may operate in a first configuration setting 1001*b* based on applying of first time period setting data corresponding to a first time period 101*b*. Also, the first configuration setting 1001*b*, for example, the electronic device may be logged in by a first user. User setting data of the first user received in response to the login of the first user may be stored in the electronic device and may be applied to the electronic device.

According to various embodiments, in the first configuration setting 1001*b*, the electronic device may obtain a user input associated with settings of the electronic device from a user. The setting change that occurs according to the user input may be the user setting data and may be stored or updated in the electronic device (above, corresponding to operation 901 and operation 903 of FIG. 9).

According to an embodiment, while the electronic device operates in the first configuration setting 1001*b*, a user may be logged out before the specified time point 1011*b* (see, 'Y' in operation 905 and operation 907 of FIG. 9). According to an embodiment, the electronic device may determine whether the specified time point 1011*b* elapses within a preset time period 1020*b* as of the logout time point of a user (see, operation 917 of FIG. 9).

For example, the electronic device may determine that the specified time point 1011*b* elapses within the preset time period 1020*b* as of the logout time point of a user ('Y' in operation 917 of FIG. 9). In this case, if the specified time point 1011*b* is reached, the electronic device may receive the second time period setting data corresponding to a second time period 102*b* from a server by using a separate process (e.g., a process in background) as of the specified time point 1011*b* (see, operation 927 of FIG. 9). For example, since the electronic device executes an operation of receiving the second time period setting data in background, the electronic device may maintain the first configuration setting 1001*b* while the electronic device executes the operation.

According to an embodiment, if the specified time point 1011*b* elapses as of the logout time point of a user, the status of the electronic device may change from the first configuration setting 1001*b* to a setting switch interval 1002*b*. During the setting switch interval 1002*b*, the electronic device may back up user setting data, may delete the first time period setting data and the user setting data, and may apply the second time period setting data that is previously received (see, operation 929 to operation 933 of FIG. 9). As of the ending time point of the setting switch interval 1002*b*, that is, a completion time point (a setting switch completion time point 1012*b*) of applying of the second time period setting data, the status of the electronic device may be switched to a second configuration setting 1003*b*.

According to various embodiments of this disclosure, the electronic device may change hardware and/or software setting based on the policy of a system at intervals of specified time periods. According to an embodiment, since setting data which is applied during a second time period is previously received during a first time period, which leads the second time period, in background, the electronic device may reduce a time period to which the setting data is applied during the second time period. As such, a user may speedily use the electronic device, to which the setting data corresponding to the second time period is applied, after the login of the user.

In addition, in the electronic device, a setting corresponding to the second time period may be changed based on the login/logout of a user during the first time period. As such, a plurality of users may sequentially utilize the electronic device.

Moreover, a server that manages the electronic device may increase high efficiency and convenience of device management by applying various policies to a device based on a time zone. The server may provide both a manager and a user with high efficiency and convenience by managing the system policy.

As described above, an electronic device may include a communication circuit configured to communicate with an external device, a memory configured to store first setting data corresponding to a first time period, and a processor operatively connected with the communication circuit and the memory. The processor may be configured to receive second setting data corresponding to a second time period from the external device through the communication circuit if a specified time point is reached, to delete at least a portion of the first setting data based on whether a status of a user is a login status or a logout status, and to apply the second setting data to the electronic device.

In the electronic device according to another embodiment, the specified time point may lead a starting time point of the second time period and may correspond to a time point of the first time period.

In the electronic device according to another embodiment, the processor may be configured to receive the second setting data in background.

In the electronic device according to another embodiment, the processor may be configured to obtain a user input associated with settings of the electronic device and to further store user setting data corresponding to the user input in the memory.

In the electronic device according to another embodiment, when the at least a portion of the first setting data is deleted, the processor may be configured to delete the user setting data from the memory after the processor sends the user setting data to the external device.

In the electronic device according to another embodiment, if the status of the user is a login status at the specified time point, the processor may be configured to perform a logout on the user, to delete the at least a portion of the first setting data, and to apply the second setting data to the electronic device.

In the electronic device according to another embodiment, the processor may be configured to provide the user with a notification associated with the logout before the specified time point is reached.

In the electronic device according to another embodiment, if the status of the user is a login status at the specified time point and if the status of the user is switched to a logout after the specified time point, the processor may be configured to delete the at least a portion of the first setting data and to apply the second setting data to the electronic device in response to the logout.

In the electronic device according to another embodiment, if the status of the user is a logout before the specified time point, the processor may be configured to delete all the first setting data and to initialize the electronic device, in response to being logged out.

In the electronic device according to another embodiment, if the status of the user is a logout before the specified time point, the processor may be configured to delete the first setting data and to initialize the electronic device, after a specified time period elapses.

In the electronic device according to another embodiment, if the specified time point is reached before the specified time period elapses, the processor may be configured to receive the second setting data from the external device, to delete the at least a portion of the first setting data, and to apply the second setting data to the electronic device.

According to another embodiment, a configuration setting updating method of an electronic device may include applying first setting data corresponding to a first time period to the electronic device, receiving second setting data corresponding to a second time period from the external device if a specified time point is reached, deleting at least a portion of the first setting data based on whether a status of a user is a login status or a logout status, and applying the second setting data to the electronic device.

According to another embodiment, the configuration setting updating method may further include performing a logout on the user if the user is logged in at the specified time point. The deleting of the at least a portion of the first setting data may be performed in response to the logout.

In the configuration setting updating method according to another embodiment, the at least a portion of the first setting data may be deleted in response to the logout if the user is logged in at the specified time point and if the user is logged out after the specified time point.

According to another embodiment, the configuration setting updating may further include deleting the first setting data and initializing the electronic device after a specified time period elapses if the user is logged out before the specified time point.

According to an embodiment, in a computer-readable recording medium having recorded thereon an instruction, the instruction, which is executed by at least one processor, causing the processor to perform a method. The method may include applying first setting data corresponding to a first time period to the electronic device, receiving second setting data corresponding to a second time period from the external device if a specified time point is reached, deleting at least a portion of the first setting data based on whether a status of a user is a login status or a logout status, and applying the second setting data to the electronic device.

According to another embodiment, the method may further include performing a logout on the user if the user is logged in at the specified time point. The deleting of the at least a portion of the first setting data may be performed in response to the logout.

According to another embodiment, in the instructions of the computer-readable recording medium, the at least a portion of the first setting data may be deleted in response to the logout if the user is logged in at the specified time point and if the user is logged out after the specified time point.

According to another embodiment, the method may further include deleting the first setting data and initializing the electronic device after a specified time period elapses if the user is logged out before the specified time point.

According to an embodiment, an electronic device may include a memory configured to store a plurality of applications comprising a first application and a second application and a processor. The processor may be configured to verify time information about the electronic device, to modify at least a portion of the first application or to install a third application if the time information is information corresponding to a first time period, and to modify at least a portion of the second application or to install a fourth application if the time information is information corresponding to a second time period.

In the electronic device according to another embodiment, the processor may be configured to obtain user information corresponding to the electronic device and to modify the at least a portion of the first application, to install the third application, to modify the at least a portion of the second application, or to install the fourth application, based further on determination that the user information satisfies a specified condition.

In the electronic device according to another embodiment, the processor may be configured to provide information about an operation corresponding to the first time period or an operation corresponding to the second time period through a display operatively connected with the processor.

In the electronic device according to another embodiment, the processor may be configured to obtain user input associated with the first time period or the second time period and to modify the at least a portion of the first application, to install the third application, to modify the at least a portion of the second application, or to install the fourth application, based further on an input of the user.

In the electronic device according to another embodiment, the processor may be configured to refrain from installing the fourth application if the third application is installed and to refrain from installing the third application if the fourth application is installed.

Figure 11:
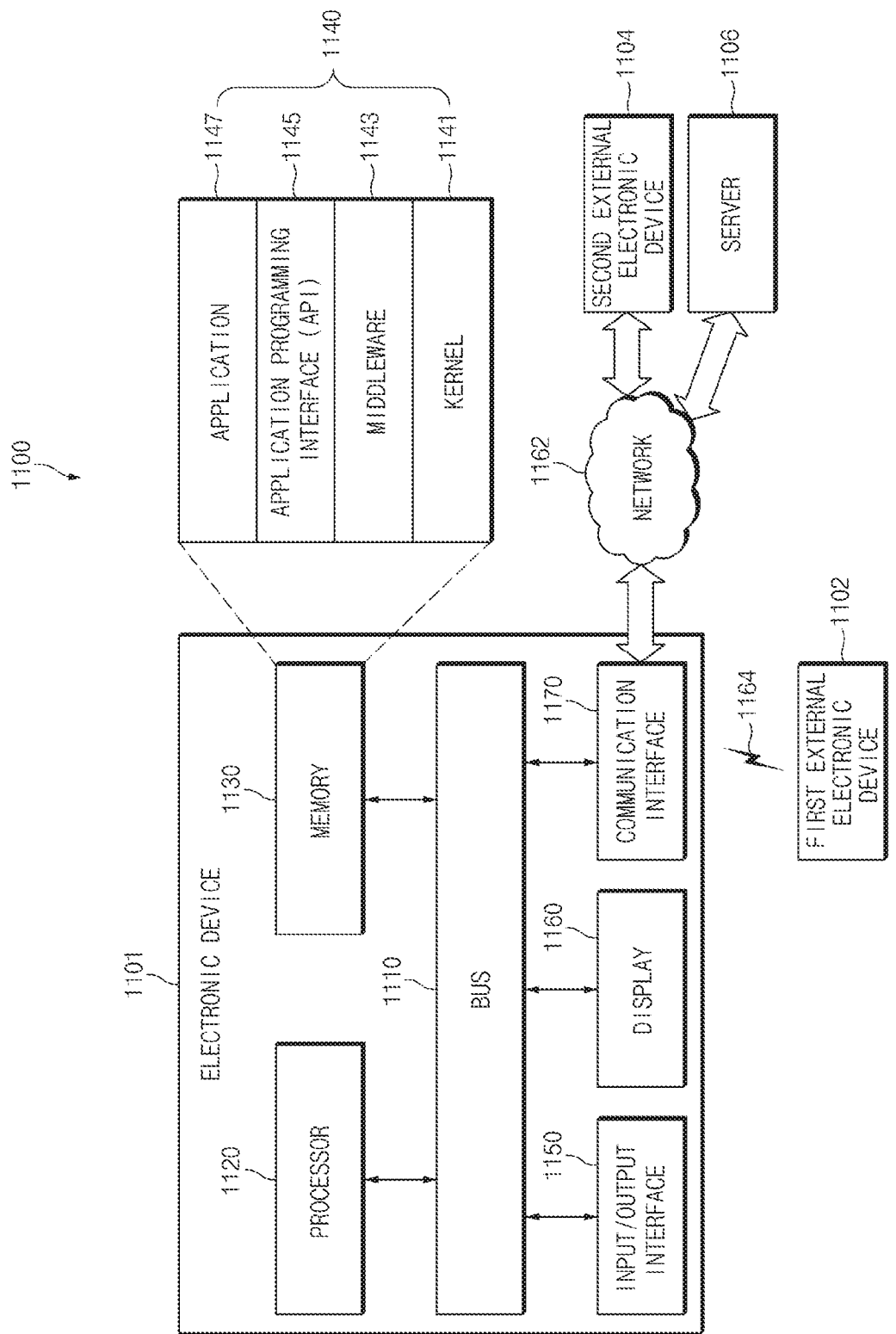
FIG. 11 illustrates an electronic device, according to various embodiments.

FIG. 11 illustrates an electronic device according to various embodiments.

Referring to FIG. 11, according to various embodiments, an electronic device 1101, 1102, or 1104 or a server 1106 may be connected with each other over a network 1162 or a local area network 1164. The electronic device 1101 may include a bus 1110, a processor 1120, a memory 1130, an input/output (I/O) interface 1150, a display 1160, and a communication interface 1170. According to an embodiment, the electronic device 1101 may not include at least one of the above-described elements or may further include other element(s).

For example, the bus 1110 may interconnect the above-described elements 1110 to 1170 and may include a circuit for conveying communications (e.g., a control message and/or data) among the above-described elements.

The processor 1120 may include one or more of a central processing unit (CPU), an application processor (AP), or a communication processor (CP). The processor 1120 may perform, for example, data processing or an operation associated with control or communication of at least one other element(s) of the electronic device 1101.

The memory 1130 may include a volatile and/or nonvolatile memory. For example, the memory 1130 may store instructions or data associated with at least one other component(s) of the electronic device 1101. According to an embodiment, the memory 1130 may store software and/or a program 1140. The program 1140 may include, for example, a kernel 1141, a middleware 1143, an application programming interface (API) 1145, and/or an application program (or an application) 1147. At least a part of the kernel 1141, the middleware 1143, or the API 1145 may be referred to as an "operating system (OS)".

The kernel 1141 may control or manage system resources (e.g., the bus 1110, the processor 1120, the memory 1130, and the like) that are used to execute operations or functions of other programs (e.g., the middleware 1143, the API 1145, and the application program 1147). Furthermore, the kernel 1141 may provide an interface that allows the middleware 1143, the API 1145, or the application program 1147 to access discrete elements of the electronic device 1101 so as to control or manage system resources.

The middleware 1143 may perform, for example, a mediation role such that the API 1145 or the application program 1147 communicates with the kernel 1141 to exchange data.

Furthermore, the middleware 1143 may process one or more task requests received from the application program 1147 according to a priority. For example, the middleware 1143 may assign the priority, which makes it possible to use a system resource (e.g., the bus 1110, the processor 1120, the memory 1130, or the like) of the electronic device 1101, to at least one of the application program 1147. For example, the middleware 1143 may process the one or more task requests according to the priority assigned to the at least one, which makes it possible to perform scheduling or load balancing on the one or more task requests.

The API 1145 may be an interface through which the application program 1147 controls a function provided by the kernel 1141 or the middleware 1143, and may include, for example, at least one interface or function (e.g., an instruction) for a file control, a window control, image processing, a character control, or the like.

The I/O interface 1150 may transmit an instruction or data, input from a user or another external device, to other element(s) of the electronic device 1101. Furthermore, the I/O interface 1150 may output an instruction or data, received from other component(s) of the electronic device 1101, to a user or another external device.

The display 1160 may include, for example, a liquid crystal display (LCD), a light-emitting diode (LED) display, an organic LED (OLED) display, a microelectromechanical systems (MEMS) display, or an electronic paper display. The display 1160 may display, for example, various contents (e.g., a text, an image, a video, an icon, a symbol, and the like) to a user. The display 1160 may include a touch screen and may receive, for example, a touch, gesture, proximity, or hovering input using an electronic pen or a part of a user's body.

The communication interface 1170 may establish communication between the electronic device 1101 and an external electronic device (e.g., a first external electronic device 1102, a second external electronic device 1104, or a server 1106). For example, the communication interface 1170 may be connected to a network 1162 over wireless communication or wired communication to communicate with the external device (e.g., the second external electronic device 1104 or the server 1106).

The wireless communication may use, for example, at least one of long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM), and the like as a cellular communication protocol. Furthermore, the wireless communication may include, for example, a local area network 1164. The local area network 1164 may include at least one of a wireless fidelity (Wi-Fi), a Bluetooth, a near field communication (NFC), a magnetic secure transmission (MST), a global navigation satellite system (GNSS), or the like.

The MST may generate a pulse based on transmission data by using an electromagnetic signal, and the pulse may generate a magnetic field signal. The electronic device 1101 may send the magnetic field signal to point of sale (POS). The POS may detect the magnetic field signal using a MST reader and may recover the data by converting the detected magnetic field signal to an electrical signal.

The GNSS may include at least one of a global positioning system (GPS), a global navigation satellite system (Glonass), a Beidou Navigation Satellite System (hereinafter referred to as "Beidou"), or a European global satellite-based navigation system (Galileo). Hereinafter, "GPS" and "GNSS" may be used interchangeably in this disclosure. The wired communication may include at least one of, for example, a universal serial bus (USB), a high definition multimedia interface (HDMI), a recommended standard-232 (RS-232), a plain old telephone service (POTS), or the like. The network 1162 may include at least one of telecommunications networks, for example, a computer network (e.g., LAN or WAN), an Internet, or a telephone network.

Each of the external first and second external electronic devices 1102 and 1104 may be a device of which the type is different from or the same as that of the electronic device 1101. According to an embodiment, the server 1106 may include a server or a group of two or more servers. According to various embodiments, all or a part of operations that the electronic device 1101 may be executed by another or plural electronic devices (e.g., the electronic devices 1102 and 1104 and the server 1106). According to an embodiment, in the case where the electronic device 1101 executes any function or service automatically or in response to a request, the electronic device 1101 may not perform the function or the service internally, but, alternatively additionally, it may request at least a part of a function associated with the electronic device 1101 at other device (e.g., the electronic device 1102 or 1104 or the server 1106). The other electronic device (e.g., the electronic device 1102 or 1104 or the server 1106) may execute the requested function or additional function and may send the execution result to the electronic device 1101. The electronic device 1101 may provide the requested function or service using the received result or may additionally process the received result to provide the requested function or service. To this end, for example, cloud computing, distributed computing, or client-server computing may be used.

Figure 12:
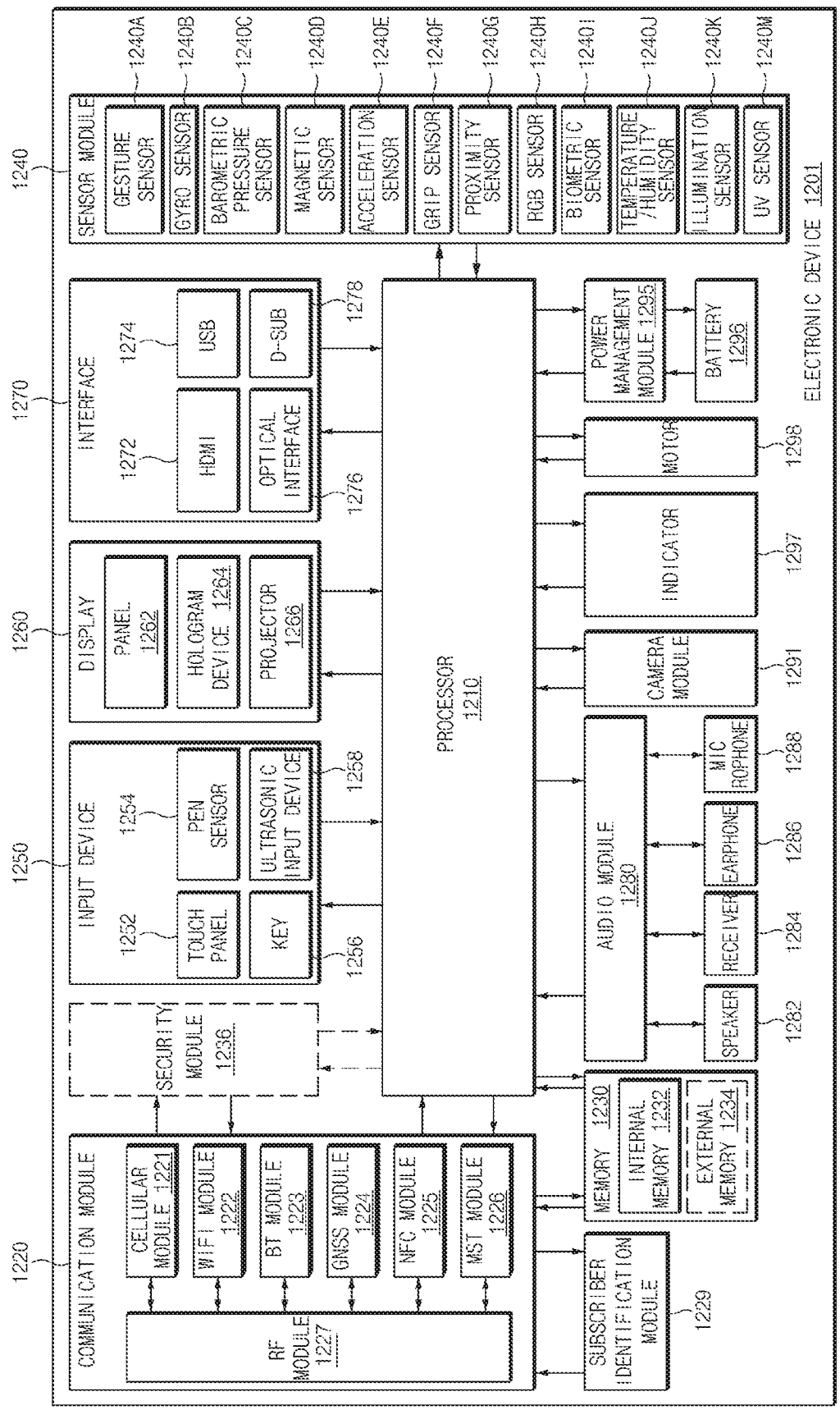
FIG. 12 illustrates a block diagram of an electronic device, according to various embodiments.

FIG. 12 illustrates a block diagram of an electronic device according to various embodiments.

Referring to FIG. 12, the electronic device 1201 may include, for example, all or a part of the electronic device 1101 illustrated in FIG. 11. The electronic device 1201 may include one or more processors (e.g., an application processor (AP)) 1210, a communication module 1220, a subscriber identification module 1224, a memory 1230, a sensor module 1240, an input device 1250, a display 1260, an interface 1270, an audio module 1280, a camera module 1291, a power management module 1295, a battery 1296, an indicator 1297, and a motor 1298.

The processor 1210 may drive an operating system (OS) or an application program to control a plurality of hardware or software elements connected to the processor 1210 and may process and compute a variety of data. The processor 1210 may be implemented with a System on Chip (SoC), for example. According to an embodiment, the processor 1210 may further include a graphic processing unit (GPU) and/or an image signal processor (ISP). The processor 1210 may include at least a part (e.g., a cellular module 1221) of elements illustrated in FIG. 2. The processor 1210 may load and process an instruction or data, which is received from at least one of other components (e.g., a nonvolatile memory), and may store a variety of data at a nonvolatile memory.

The communication module 1220 may be configured the same as or similar to a communication interface 1170 of FIG. 11. The communication module 1220 may include a cellular module 1221, a Wi-Fi module 1222, a Bluetooth (BT) module 1223, a GNSS module 1224 (e.g., a GPS module, a Glonass module, a Beidou module, or a Galileo module), a near field communication (NFC) module 1225, a MST module 1226, and a radio frequency (RF) module 1227.

The cellular module 1221 may provide a voice call, a video call, a character service, an Internet service, or the like over a communication network. According to an embodiment, the cellular module 1221 may perform discrimination and authentication of the electronic device 1201 within a communication network using the subscriber identification module 1229 (e.g., a SIM card), for example. According to an embodiment, the cellular module 1221 may perform at least a part of functions that the processor 1210 provides. According to an embodiment, the cellular module 1221 may include a communication processor (CP).

Each of the Wi-Fi module 1222, the BT module 1223, the GNSS module 1224, the NFC module 1225, or the MST module 1226 may include a processor that processes data exchanged through a corresponding module, for example. According to various embodiments of this disclosure, at least a part (e.g., two or more components) of the cellular module 1221, the Wi-Fi module 1222, the BT module 1223, the GNSS module 1224, the NFC module 1225, or the MST module 1226 may be included within one Integrated Circuit (IC) or an IC package.

The RF module 1227 may send and receive, for example, a communication signal (e.g., an RF signal). For example, the RF module 1227 may include a transceiver, a power amplifier module (PAM), a frequency filter, a low noise amplifier (LNA), an antenna, or the like. According to another embodiment, at least one of the cellular module 1221, the Wi-Fi module 1222, the BT module 1223, the GNSS module 1224, the NFC module 1225, or the MST module 1226 may send and receive an RF signal through a separate RF module.

The subscriber identification module 1229 may include, for example, a subscriber identification module and may include unique identify information (e.g., integrated circuit card identifier (ICCID)) or subscriber information (e.g., integrated mobile subscriber identity (IMSI)).

The memory 1230 (e.g., a memory 1130) may include an internal memory 1232 or an external memory 1234. For example, the internal memory 1232 may include at least one of a volatile memory (e.g., a dynamic random access memory (DRAM), a static RAM (SRAM), or a synchronous DRAM (SDRAM)), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a NAND flash memory, or a NOR flash memory), a hard drive, or a solid state drive (SSD).

The external memory 1234 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 1234 may be operatively and/or physically connected with the electronic device 1201 through various interfaces.

The security module 1236 may be a module that includes a storage space of which the security level is higher than that of the memory 1230 and may be a circuit that guarantees safe data storage and a protected execution environment. The security module 1236 may be implemented with a separate circuit and may include a separate processor. For example, the security module 1236 may be in a smart chip or a secure digital (SD) card, which is removable, or may include an embedded secure element (eSE) embedded in a fixed chip of the electronic device 1201. Furthermore, the security module 1236 may operate based on an operating system (OS) that is different from the OS of the electronic device 1201. For example, the security module 1236 may operate based on java card open platform (JCOP) OS.

The sensor module 1240 may measure, for example, a physical quantity or may detect an operation state of the electronic device 1201. The sensor module 1040 may convert the measured or detected information to an electric signal. For example, the sensor module 1240 may include at least one of, for example, a gesture sensor 1240A, a gyro sensor 1240B, a pressure sensor 1240C, a magnetic sensor 1240D, an acceleration sensor 1240E, a grip sensor 1240F, a proximity sensor 1240G, a color sensor 1240H (e.g., a red, green, blue (RGB) sensor), a biometric sensor 1240I, a temperature/humidity sensor 1240J, an illuminance sensor 1240K, or an ultra violet (UV) sensor 1240M. Additionally or generally, the sensor module 1240 may further include, for example, an E-nose sensor, an electromyography sensor (EMG) sensor, an electroencephalogram (EEG) sensor, an electrocardiogram (ECG) sensor, a photoplethysmographic (PPG) sensor, an infrared (IR) sensor, an iris sensor, and/or a fingerprint sensor. The sensor module 1240 may further include a control circuit that controls at least one or more sensors included therein. According to an embodiment, the electronic device 1201 may further include a processor which is a part of the processor 1210 or independent of the processor 1210 and is configured to control the sensor module 1240. The processor may control the sensor module 1240 while the processor 2110 remains at a sleep state.

The input device 1250 may include, for example, a touch panel 1252, a (digital) pen sensor 1254, a key 1256, or an ultrasonic input unit 1258. The touch panel 1252 may use at least one of capacitive, resistive, infrared and ultrasonic detecting methods. Also, the touch panel 1252 may further include a control circuit. The touch panel 1252 may further include a tactile layer to provide a tactile reaction to a user.

The (digital) pen sensor 1254 may be, for example, a part of a touch panel or may include an additional sheet for recognition. The key 1256 may include, for example, a physical button, an optical key, a keypad, and the like. The ultrasonic input device 1258 may detect (or sense) an ultrasonic signal, which is generated from an input device, through a microphone (e.g., a microphone 1288) and may check data corresponding to the detected ultrasonic signal.

The display 1260 (e.g., the display 1160) may include a panel 1262, a hologram device 1264, or a projector 1266. The panel 1262 may be configured the same as or similar to the display 1160 of FIG. 11. The panel 1262 may be implemented to be flexible, transparent or wearable, for example. The panel 1262 and the touch panel 1252 may be integrated into a single module. According to an embodiment, the panel 1262 may include a pressure sensor (or referred to as a "force sensor") that is capable of measuring the intensity of pressure on the touch of a user. The pressure sensor may be implemented with a combination with the touch panel 1252 or may be implemented with one or more sensors that are independent of the touch panel 1252. The hologram device 1264 may display a stereoscopic image in a space by using a light interference phenomenon. The projector 1266 may project light onto a screen so as to display an image. The screen may be arranged inside or outside the electronic device 1201. According to an embodiment, the display 1260 may further include a control circuit that controls the panel 1262, the hologram device 1264, or the projector 1266.

The interface 1270 may include, for example, a high-definition multimedia interface (HDMI) 1272, a universal serial bus (USB) 1274, an optical interface 1276, or a D-subminiature (D-sub) 1278. The interface 1270 may be included, for example, in the communication interface 1170 illustrated in FIG. 11. Additionally or generally, the interface 1270 may include, for example, a mobile high definition link (MHL) interface, a SD card/multi-media card (MMC) interface, or an infrared data association (IrDA) standard interface.

The audio module 1280 may convert a sound and an electric signal in dual directions. At least a part of the audio module 1280 may be included, for example, in the input/output interface 1150 illustrated in FIG. 11. The audio module 1280 may process, for example, sound information that is input or output through a speaker 1282, a receiver 1284, an earphone 1286, or a microphone 1288.

The camera module 1291 that shoots a still image or a video may include, for example, at least one image sensor (e.g., a front sensor or a rear sensor), a lens, an image signal processor (ISP), or a flash (e.g., an LED or a xenon lamp).

The power management module 1295 may manage, for example, power of the electronic device 1201. According to an embodiment of this disclosure, a power management integrated circuit (PMIC) a charger IC, or a battery or fuel gauge may be included in the power management module 1295. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 1296 and a voltage, current or temperature thereof while the battery is charged. The battery 1296 may include, for example, a rechargeable battery or a solar battery.

The indicator 1297 may display a specific state of the electronic device 1201 or a part thereof (e.g., the processor 1210), such as a booting state, a message state, a charging state, and the like. The motor 1298 may convert an electrical signal into a mechanical vibration and may generate the following effects: vibration, haptic, and the like. Although not illustrated, a processing device (e.g., a GPU) for supporting a mobile TV may be included in the electronic device 1201. The processing device that supports a mobile TV may process media data according to the standards of digital multimedia broadcasting (DMB), digital video broadcasting (DVB), MediaFlo™, or the like.

Each of the above-mentioned elements of the electronic device according to various embodiments of this disclosure may be configured with one or more components, and the names of the elements may be changed according to the type of the electronic device. The electronic device according to various embodiments of this disclosure may include at least one of the above-mentioned elements, and some elements may be omitted or other additional elements may be added. Furthermore, some of the elements of the electronic device according to various embodiments may be combined with each other so as to form one entity, so that the functions of the elements may be performed in the same manner as before the combination.

Figure 13:
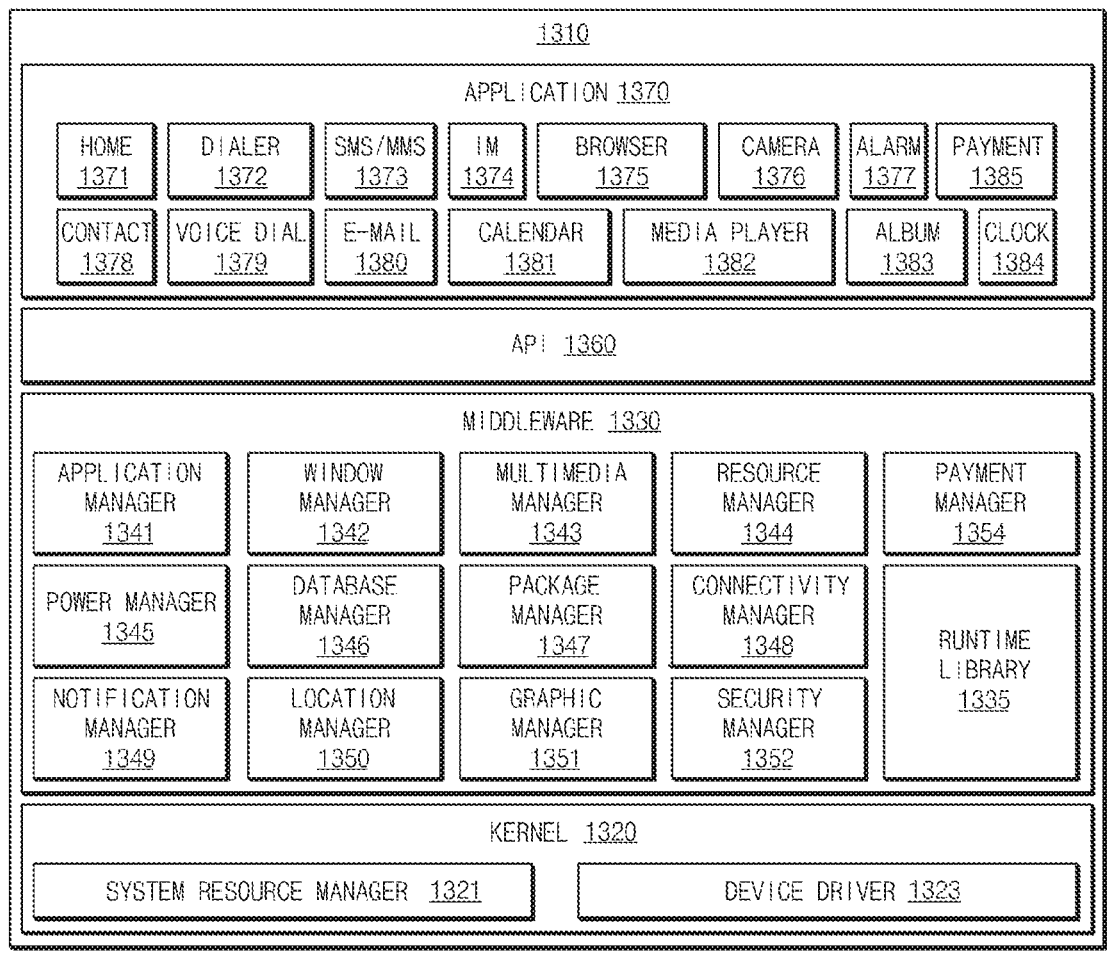
FIG. 13 illustrates a block diagram of a program module, according to various embodiments.

FIG. 13 illustrates a block diagram of a program module, according to various embodiments.

According to an embodiment, a program module 1310 (e.g., the program 1140) may include an operating system (OS) to control resources associated with an electronic device (e.g., the electronic device 1101), and/or diverse applications (e.g., the application program 1147) driven on the OS. The OS may be, for example, Android™, iOS™, Windows™, Symbian™, Tizen™, or Samsung Bada OS™.

The program module 1310 may include a kernel 1320, a middleware 1330, an application programming interface (API) 1360, and/or an application 1370. At least a part of the program module 1310 may be preloaded on an electronic device or may be downloadable from an external electronic device (e.g., the electronic device 1102 or 1104, the server 1106, and the like).

The kernel 1320 (e.g., the kernel 1141) may include, for example, a system resource manager 1321, or a device driver 1323. The system resource manager 1321 may control, allocate, or retrieve system resources. According to an embodiment, the system resource manager 1321 may include a process managing part, a memory managing part, or a file system managing part. The device driver 1323 may include, for example, a display driver, a camera driver, a Bluetooth driver, a common memory driver, an USB driver, a keypad driver, a Wi-Fi driver, an audio driver, or an inter-process communication (IPC) driver.

The middleware 1330 may provide, for example, a function which the application 1370 needs in common or may provide diverse functions to the application 1370 through the API 1360 to allow the application 1370 to efficiently use limited system resources of the electronic device. According to an embodiment, the middleware 1330 (e.g., the middleware 1143) may include at least one of a runtime library 1335, an application manager 1341, a window manager 1342, a multimedia manager 1343, a resource manager 1344, a power manager 1345, a database manager 1346, a package manager 1347, a connectivity manager 1348, a notification manager 1349, a location manager 1350, a graphic manager 1351, or a security manager 1352, or a payment manager 1354.

The runtime library 1335 may include, for example, a library module which is used by a compiler to add a new function through a programming language while the application 1370 is being executed. The runtime library 1335 may perform input/output management, memory management, or capacities about arithmetic functions.

The application manager 1341 may manage, for example, a life cycle of at least one application of the application 1370. The window manager 1342 may manage a graphic user interface (GUI) resource which is used in a screen. The multimedia manager 1343 may identify a format necessary for playing diverse media files, and may perform encoding or decoding of media files by using a codec suitable for the format. The resource manager 1344 may manage resources such as a storage space, memory, or source code of at least one application of the application 1370.

The power manager 1345 may operate, for example, with a basic input/output system (BIOS) to manage a battery or power, and may provide power information for an operation of an electronic device. The database manager 1346 may generate, search for, or modify database which is to be used in at least one application of the application 1370. The package manager 1347 may install or update an application which is distributed in the form of a package file.

The connectivity manager 1348 may manage, for example, wireless connection such as Wi-Fi or Bluetooth. The notification manager 1349 may display or notify an event such as arrival message, appointment, or proximity notification in a mode that does not disturb a user. The location manager 1350 may manage location information of an electronic device. The graphic manager 1351 may manage a graphic effect that is provided to a user, or manage a user interface relevant thereto. The security manager 1352 may provide a general security function necessary for system security, user authentication, or the like. According to an embodiment of this disclosure, in the case where an electronic device (e.g., the electronic device 1101) includes a telephony function, the middleware 1330 may further includes a telephony manager for managing a voice or video call function of the electronic device.

The middleware 1330 may include a middleware module that combines diverse functions of the above-described elements. The middleware 1330 may provide a module specialized to each OS kind to provide differentiated functions. In addition, the middleware 1330 may remove a part of the preexisting elements, dynamically, or may add new elements thereto.

The API 1360 (e.g., the API 1145) may be, for example, a set of programming functions and may be provided with a configuration which is variable depending on an OS. For example, in the case where an OS is Android™ or iOS™, it may provide one API set per platform. In the case where an OS is Tizen™, it may provide two or more API sets per platform.

The application 1370 (e.g., the application program 1147) may include, for example, one or more applications capable of providing functions for a home 1371, a dialer 1372, an SMS/MMS 1373, an instant message (IM) 1374, a browser 1375, a camera 1376, an alarm 1377, a contact 1378, a voice dial 1379, an e-mail 1380, a calendar 1381, a media player 1382, an album 1383, a clock 1384, and a payment 1385 or for offering health care (e.g., measuring an exercise quantity or blood sugar) or environment information (e.g., information of barometric pressure, humidity, or temperature).

According to an embodiment, the application 1370 may include an application (hereinafter referred to as "information exchanging application" for descriptive convenience) to support information exchange between the electronic device (e.g., the electronic device 1101) and an external electronic device (e.g., the electronic device 1102 or 1104). The information exchanging application may include, for example, a notification relay application for transmitting specific information to the external electronic device, or a device management application for managing the external electronic device.

For example, the information exchanging application may include a function of transmitting notification information, which arise from other applications (e.g., applications for SMS/MMS, e-mail, health care, or environmental information), to an external electronic device (e.g., the electronic device 1102 or 1104). Additionally, the information exchanging application may receive, for example, notification information from an external electronic device and provide the notification information to a user.

The device management application may manage (e.g., install, delete, or update), for example, at least one function (e.g., turn-on/turn-off of an external electronic device itself (or a part of components) or adjustment of brightness (or resolution) of a display) of the external electronic device (e.g., the electronic device 1102 or 1104) which communicates with the electronic device, an application running in the external electronic device, or a service (e.g., a call service, a message service, or the like) provided from the external electronic device.

According to an embodiment, the application 1370 may include an application (e.g., a health care application) which is assigned in accordance with an attribute (e.g., an attribute of a mobile medical device as a kind of electronic device) of an external electronic device (e.g., the electronic device 1102 or 1104). According to an embodiment, the application 1370 may include an application which is received from an external electronic device (e.g., the server 1106 or the electronic device 1102 or 1104). According to an embodiment, the application 1370 may include a preloaded application or a third party application which is downloadable from a server. The titles of elements in the program module 1310 according to the embodiment may be modifiable depending on kinds of operating systems.

According to various embodiments, at least a part of the program module 1310 may be implemented by software, firmware, hardware, or a combination of two or more thereof. At least a part of the program module 1310 may be implemented (e.g., executed), for example, by a processor (e.g., the processor 1210). At least a portion of the program module 1310 may include, for example, modules, programs, routines, sets of instructions, processes, or the like, for performing one or more functions.

The term "module" used herein may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments of this disclosure may be, for example, implemented by instructions stored in a computer-readable storage media in the form of a program module. The instruction, when executed by a processor (e.g., the processor 1120), may cause the one or more processors to perform a function corresponding to the instruction. The computer-readable storage media, for example, may be the memory 1130.

A computer-readable recording medium may include a hard disk, a magnetic media, a floppy disk, a magnetic media (e.g., a magnetic tape), an optical media (e.g., a compact disc read only memory (CD-ROM) and a digital versatile disc (DVD), a magneto-optical media (e.g., a floptical disk), and hardware devices (e.g., a read only memory (ROM), a random access memory (RAM), or a flash memory). Also, a program instruction may include not only a mechanical code such as things generated by a compiler but also a high-level language code executable on a computer using an interpreter. The above hardware unit may be configured to operate via one or more software modules for performing an operation of this disclosure, and vice versa.

A module or a program module according to various embodiments of this disclosure may include at least one of the above elements, or a part of the above elements may be omitted, or additional other elements may be further included. Operations performed by a module, a program module, or other elements according to various embodiments of this disclosure may be executed sequentially, in parallel, repeatedly, or in a heuristic method. In addition, a part of operations may be executed in different sequences or may be omitted. Alternatively, other operations may be added.

According to various embodiments disclosed in this disclosure, the electronic device may change hardware and/or software settings based on the policy of a system at intervals of specified time periods. According to an embodiment, since setting data which is applied during a second time period is previously received during a first time period, which leads the second time period, in background, the electronic device may reduce a time period to which the setting data is applied during the second time period. As such, a user may speedily use the electronic device, to which the setting data corresponding to the second time period is applied, after the login of the user. Besides, a variety of effects directly or indirectly understood through this disclosure may be provided.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device usable by at least one user comprising:
   a communication circuit configured to communicate with an external device;
   a memory configured to store first setting data corresponding to a first time period; and
   a processor operatively connected with the communication circuit and the memory, the processor configured to:
   receive second setting data corresponding to a second time period from the external device through the communication circuit if a specified time point is reached,
   delete at least a portion of the first setting data based on whether a status of a first user is a login status or a logout status, and
   apply the second setting data to the electronic device,
   wherein the second setting data includes at least one of list information of applications that a second user installs, a document file, an image file, a video file, or an email storage list,
   wherein the processor is further configured to:
   obtain a user input associated with settings of the electronic device, and
   further store user setting data corresponding to the user input in the memory, and
   wherein if the status of the first user is the login status at the specified time point, the processor is further configured to:
   switch the status of the first user to the logout status,
   delete the at least a portion of the first setting data,
   apply the second setting data to the electronic device, and
   provide the first user with a notification associated with the logout status before the specified time point is reached.

2. The electronic device of claim 1, wherein the specified time point leads a starting time point of the second time period and corresponds to a time point of the first time period.

3. The electronic device of claim 1, wherein the processor is further configured to receive the second setting data in background.

4. The electronic device of claim 1, wherein when the at least a portion of the first setting data is deleted, the processor is further configured to delete the user setting data from the memory after the processor sends the user setting data to the external device.

5. The electronic device of claim 1, wherein if the status of the first user is the login status at the specified time point and if the status of the first user is switched to the logout status after the specified time point, the processor is further configured to delete the at least a portion of the first setting data and to apply the second setting data to the electronic device in response to the logout status.

6. The electronic device of claim 1, wherein if the status of the first user is switched to a logout status before the specified time point, the processor is further configured to delete all the first setting data and to initialize the electronic device, in response to the logout status.

7. The electronic device of claim 1, wherein if the status of the first user is switched to the logout status before the specified time point, the processor is further configured to delete the first setting data and to initialize the electronic device, after a specified time period elapses.

8. The electronic device of claim 7, wherein if the specified time point is reached before the specified time period elapses, the processor is further configured to:
   receive the second setting data from the external device;
   delete the at least a portion of the first setting data; and
   apply the second setting data to the electronic device.

9. A configuration setting updating method of an electronic device usable by at least one user, the method comprising:
   applying first setting data corresponding to a first time period to the electronic device;
   receiving second setting data corresponding to a second time period from an external device if a specified time point is reached;
   deleting at least a portion of the first setting data based on whether a status of a first user is a login status or a logout status;
   applying the second setting data to the electronic device, wherein the second setting data includes at least one of list information of applications that a second user installs, a document file, an image file, a video file, or an email storage list;
   obtaining a user input associated with settings of the electronic device; and
   further storing user setting data corresponding to the user input in a memory,
   wherein if the status of the first user is the login status at the specified time point:
     switching the status of the first user to the logout status,
     deleting the at least a portion of the first setting data,
     applying the second setting data to the electronic device, and
     providing the first user with a notification associated with the logout status before the specified time point is reached.

10. The method of claim 9, further comprising:
performing a logout on the first user if the first user is logged in at the specified time point,
wherein the deleting of the at least a portion of the first setting data is performed in response to being logged out.

11. The method of claim 9, wherein the at least a portion of the first setting data is deleted in response to the logout status if the first user is logged in at the specified time point and if the first user is logged out after the specified time point.

12. The method of claim 9, further comprising:
if the first user is logged out before the specified time point, deleting the first setting data and initializing the electronic device after a specified time period elapses.

* * * * *